United States Patent
Yoshida

(10) Patent No.: US 10,382,647 B2
(45) Date of Patent: Aug. 13, 2019

(54) IMAGE SENSOR UNIT, PAPER SHEET DISTINGUISHING APPARATUS, AND IMAGE READING APPARATUS

(71) Applicant: CANON COMPONENTS, INC., Kodama-gun, Saitama (JP)

(72) Inventor: Hidemasa Yoshida, Saitama (JP)

(73) Assignee: CANON COMPONENTS, INC., Saitama (JP)

(*) Notice: Subject to any disclaimer, the term of this patent is extended or adjusted under 35 U.S.C. 154(b) by 0 days.

(21) Appl. No.: 15/578,029

(22) PCT Filed: Apr. 18, 2016

(86) PCT No.: PCT/JP2016/062197
§ 371 (c)(1),
(2) Date: Nov. 29, 2017

(87) PCT Pub. No.: WO2016/194493
PCT Pub. Date: Dec. 8, 2016

(65) Prior Publication Data
US 2018/0146116 A1  May 24, 2018

(30) Foreign Application Priority Data
Jun. 4, 2015 (JP) .................................. 2015-114079

(51) Int. Cl.
*H04N 1/04* (2006.01)
*H04N 1/401* (2006.01)
(Continued)

(52) U.S. Cl.
CPC ............. *H04N 1/401* (2013.01); *G07D 7/121* (2013.01); *H04N 1/00806* (2013.01);
(Continued)

(58) Field of Classification Search
CPC .. H04N 1/401; H04N 1/00806; H04N 1/0028; H04N 1/028; H04N 1/02895;
(Continued)

(56) References Cited

U.S. PATENT DOCUMENTS 6,166,832 A * 12/2000 Fujimoto ............. H04N 1/0312
358/474
7,738,146 B2 * 6/2010 Osakabe .............. H04N 1/0313
358/474
(Continued)

FOREIGN PATENT DOCUMENTS

JP   2011049808 A *  3/2011
JP   2013009099 A *  1/2013
(Continued)

OTHER PUBLICATIONS

International Search Report issued in Intl. Appln No. PCT/JP2016/062197 dated Jul. 5, 2016. English translation provided.
(Continued)

*Primary Examiner* — Cheukfan Lee
(74) *Attorney, Agent, or Firm* — Rossi, Kimms & McDowell LLP

(57) ABSTRACT

An image sensor unit includes: multiple first light guides that shape light emitted by light sources into a line and emit linear light elongated in longitudinal direction to an object to be read (P); multiple holding members that hold each of the first light guides on a frame; and an image sensor that detects light from the object to be read (P). The multiple first light guides are parallel, and in a range in which the image sensor detects the light from the object to be read (P) in the longitudinal direction of the first light guides, center positions in the main-scan direction of the multiple holding members that hold one first light guide of the multiple light guides and center positions in the main-scan direction of the multiple holding members that hold another light guide
(Continued)

different from the one first light guide deviate from each other.

8 Claims, 16 Drawing Sheets

(51) Int. Cl.
*G07D 7/121* (2016.01)
*H04N 1/028* (2006.01)
*H04N 1/00* (2006.01)
*H04N 1/031* (2006.01)

(52) U.S. Cl.
CPC ......... *H04N 1/028* (2013.01); *H04N 1/02895* (2013.01); *H04N 1/0312* (2013.01); *H04N 1/04* (2013.01); *H04N 2201/0081* (2013.01)

(58) Field of Classification Search
CPC ............... H04N 1/0312; H04N 1/04; H04N 2201/0081; H04N 1/1936; H04N 1/0282; H04N 1/02815; H04N 1/02835; H04N 1/02845; H04N 1/02855; G06T 1/00; G07D 7/121; H01L 27/14627; G02B 6/0085; G02B 6/0073; G02B 6/0088
USPC .................................................. 358/484, 475
See application file for complete search history.

(56) References Cited

U.S. PATENT DOCUMENTS

| | | | | |
|---|---|---|---|---|
| 9,341,765 | B2* | 5/2016 | Fujiuchi | H04N 1/02855 |
| 2009/0034024 | A1* | 2/2009 | Kim | H04N 1/02815 |
| | | | | 358/475 |
| 2009/0034297 | A1* | 2/2009 | Tahk | H04N 1/02815 |
| | | | | 362/634 |
| 2010/0046045 | A1* | 2/2010 | Nagao | H04N 1/00846 |
| | | | | 358/474 |
| 2012/0318961 | A1* | 12/2012 | Sawada | H04N 1/0318 |
| | | | | 250/208.1 |
| 2013/0009037 | A1 | 1/2013 | Takahashi | |
| 2013/0038912 | A1* | 2/2013 | Horiguchi | H04N 1/02855 |
| | | | | 358/474 |
| 2013/0038913 | A1* | 2/2013 | Shimoda | G07D 7/121 |
| | | | | 358/474 |
| 2013/0038914 | A1* | 2/2013 | Yoshida | H04N 1/0285 |
| | | | | 358/474 |
| 2013/0265617 | A1* | 10/2013 | Murakami | G02B 6/0001 |
| | | | | 358/448 |
| 2013/0278976 | A1* | 10/2013 | Murakami | H04N 1/00559 |
| | | | | 358/484 |
| 2013/0314756 | A1* | 11/2013 | Amemiya | F21V 13/04 |
| | | | | 358/497 |
| 2014/0014819 | A1* | 1/2014 | Yoshida | G02B 6/0096 |
| | | | | 250/208.1 |
| 2014/0111835 | A1* | 4/2014 | Ozawa | H04N 1/028 |
| | | | | 358/475 |
| 2014/0211271 | A1* | 7/2014 | Kim | H04N 1/02815 |
| | | | | 358/474 |
| 2014/0253978 | A9* | 9/2014 | Lee | H04N 1/02835 |
| | | | | 358/474 |
| 2014/0355303 | A1* | 12/2014 | Fujiuchi | H04N 1/02855 |
| | | | | 362/611 |
| 2015/0062670 | A1* | 3/2015 | Yoshida | G02B 6/0096 |
| | | | | 358/482 |
| 2015/0110382 | A1* | 4/2015 | Shimoda | G01N 21/86 |
| | | | | 382/135 |
| 2015/0207952 | A1* | 7/2015 | Kim | H04N 1/02815 |
| | | | | 358/474 |
| 2016/0234445 | A1* | 8/2016 | Shimoda | H04N 5/332 |
| 2017/0064124 | A1* | 3/2017 | Yoshida | H04N 1/0286 |
| 2017/0064125 | A1* | 3/2017 | Tsumekawa | H04N 1/0286 |
| 2017/0171417 | A1* | 6/2017 | Kasuga | G03G 15/5025 |
| 2018/0152584 | A1* | 5/2018 | Sugiyama | H04N 1/047 |

FOREIGN PATENT DOCUMENTS

| | | |
|---|---|---|
| JP | 2013009099 A | 1/2013 |
| JP | 2015222676 A | 12/2015 |
| WO | 2011080962 A1 | 7/2011 |

OTHER PUBLICATIONS

Written Opinion issued in Intl. Appln. No. PCT/JP2016/062197 dated Jul. 5, 2016.
International Preliminary Report on Patentability issued in Intl. Appln. No. PCT/JP2016/062197 dated Dec. 14, 2017. English translation provided.
English translation of Written Opinion issued in Intl. Appln. No. PCT/JP2016/062197 dated Jul. 5, 2016, cited in IDS filed on Nov. 29, 2017.

* cited by examiner

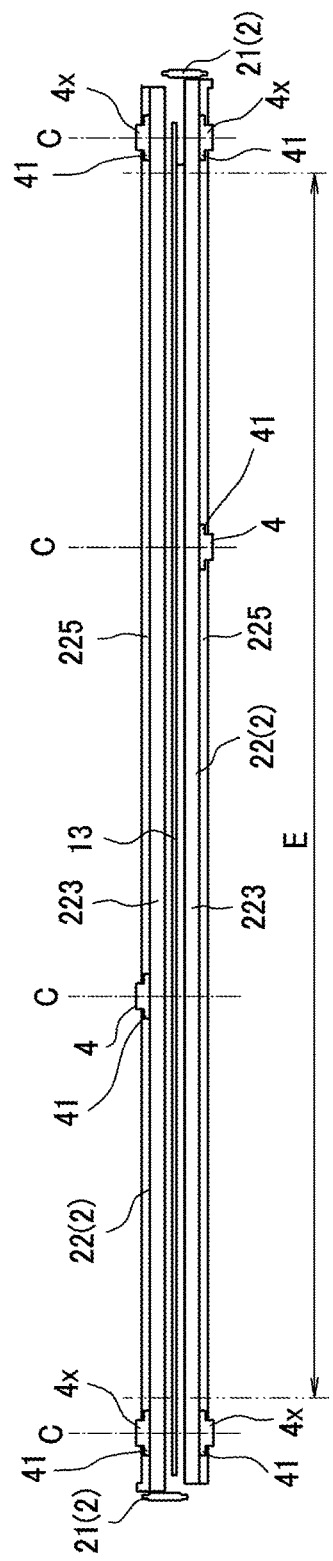

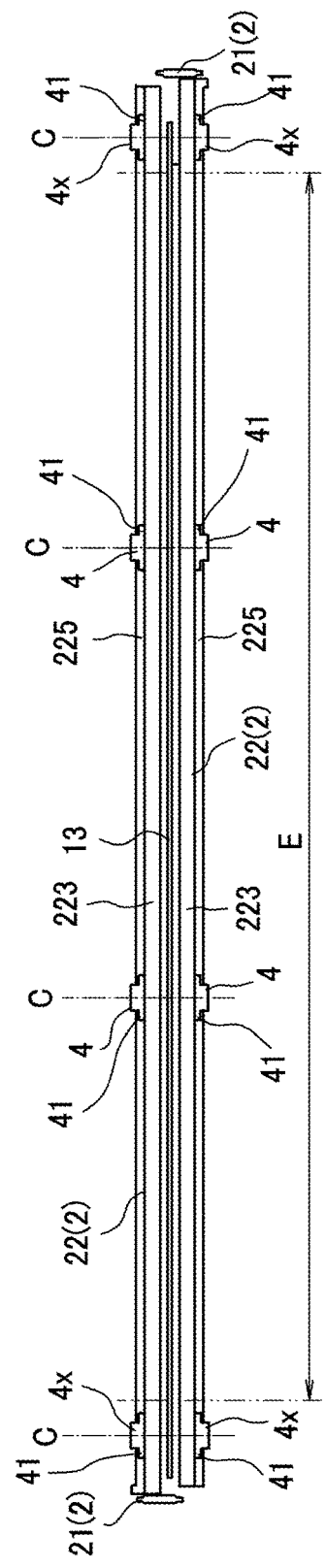

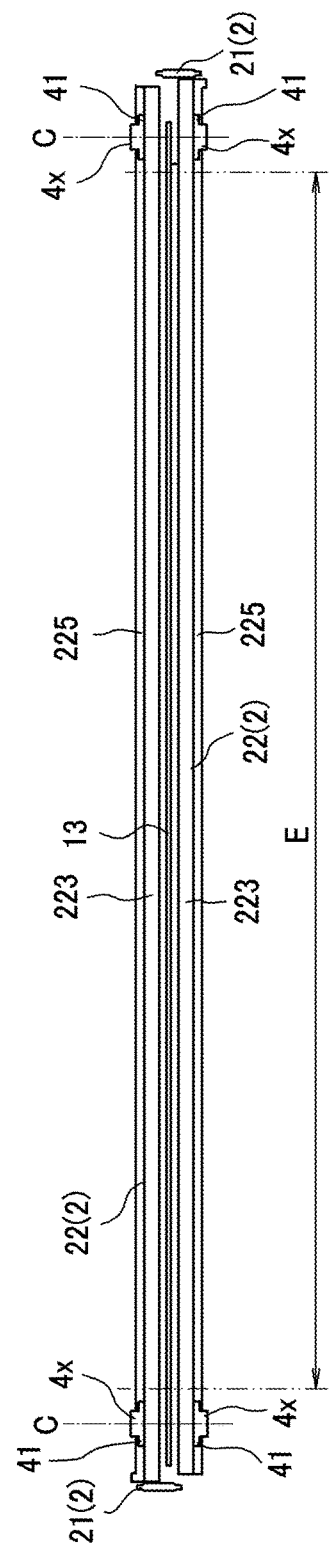

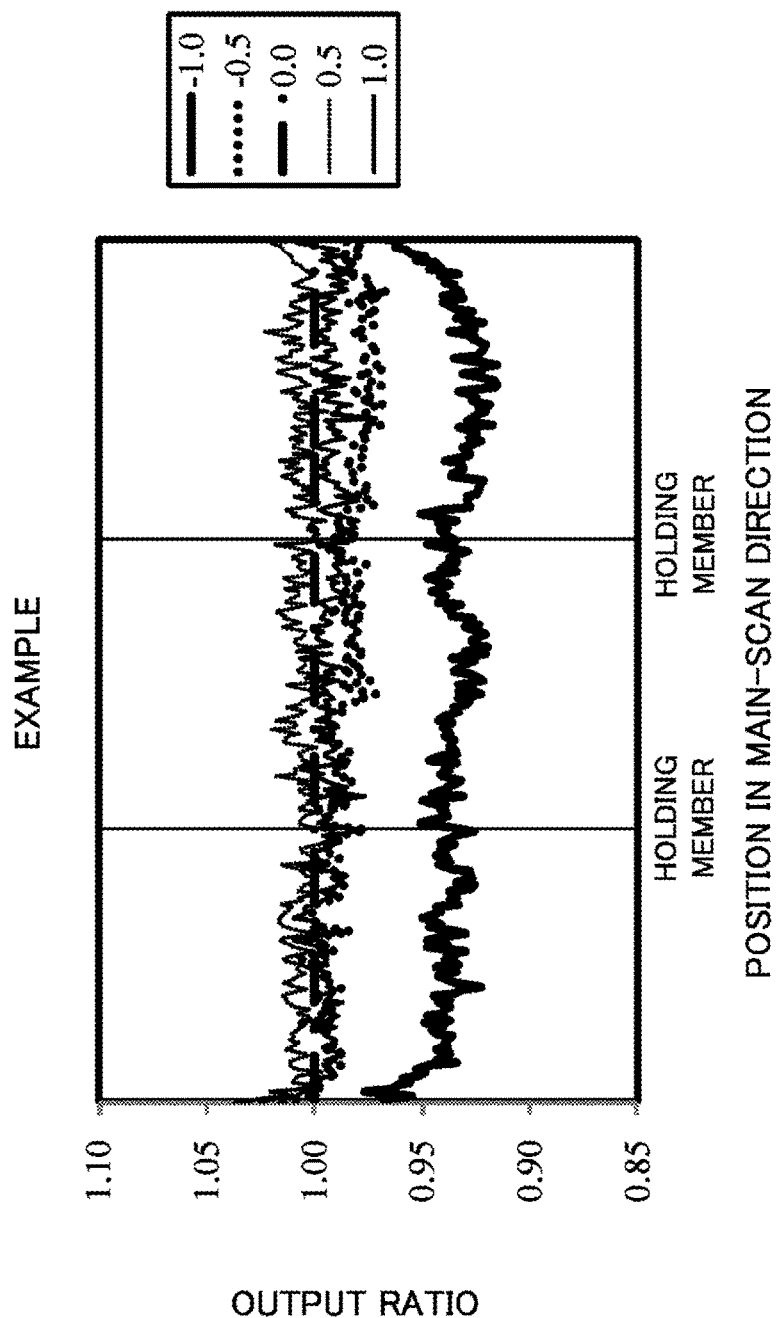

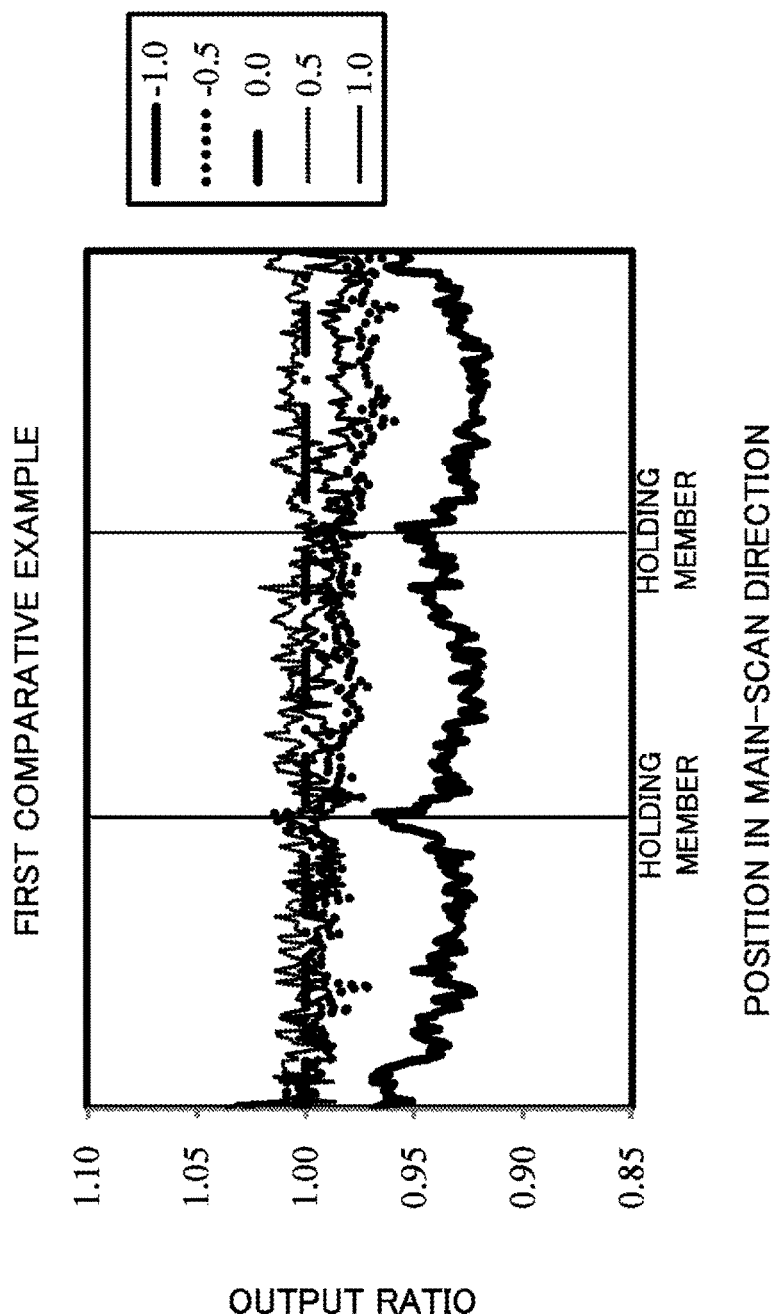

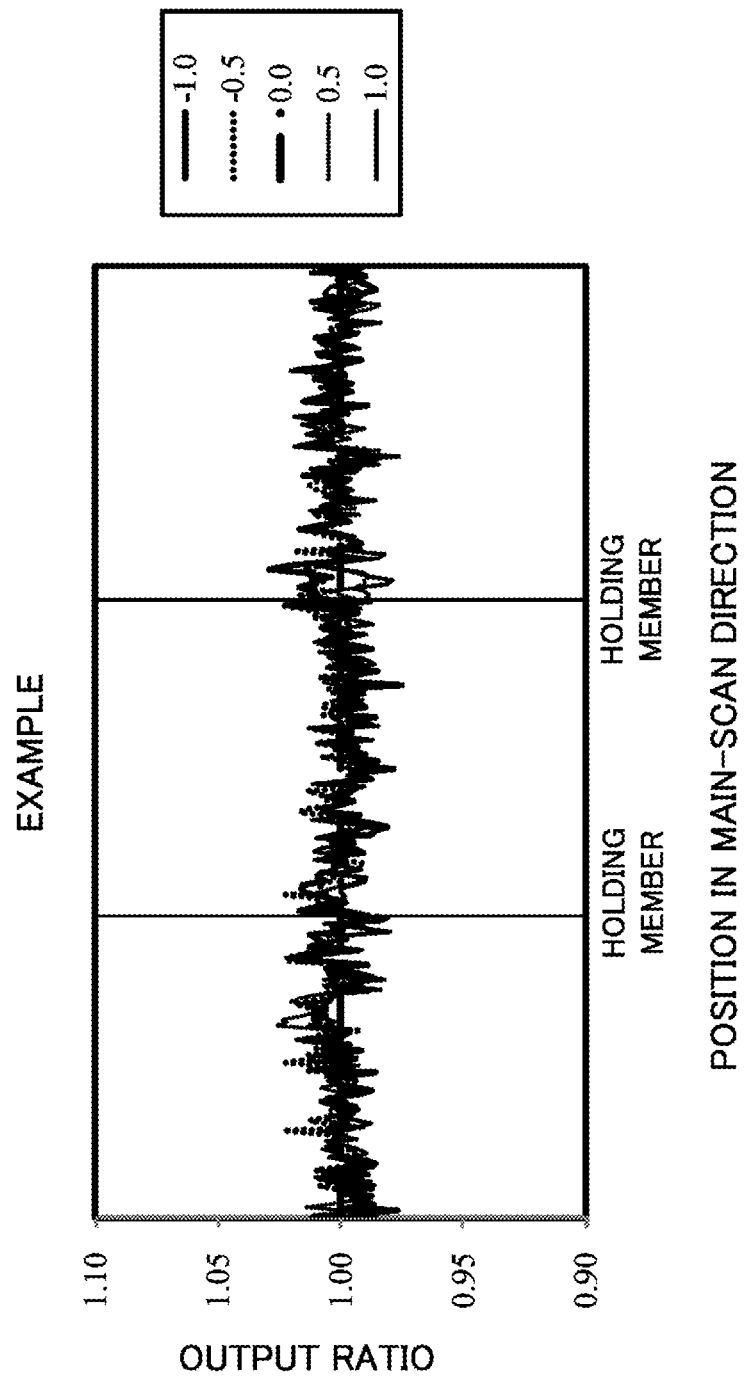

IMAGE SENSOR UNIT, PAPER SHEET DISTINGUISHING APPARATUS, AND IMAGE READING APPARATUS

TECHNICAL FIELD

The present invention relates to an image sensor unit, a paper sheet distinguishing apparatus, and an image reading apparatus.

BACKGROUND ART

An apparatus, such as a paper sheet distinguishing apparatus and an image reading apparatus, includes an image sensor unit that optically reads and outputs an object to be read. In some of the image sensor units applied to the apparatuses, light guides shape light emitted by light sources into a line (shape the light into a line light source) to emit the light to the object to be read, a light condenser condenses the light from the object to be read, and an image sensor IC array photoelectrically converts the light. The light guides provided on the image sensor unit are generally long and thin rod-like members, and long and thin light emission surfaces that emit light toward the object to be read are provided on side surfaces of the light guides. The light guides are assembled to a housing (for example, a frame) of the image sensor unit such that the light emission surfaces face the object to be read. A configuration of assembling the light guides to the housing is disclosed in Patent Literature 1, wherein in an image sensor unit including a plurality of light guides, a plurality of supporting members are mounted on each of the light guides, and the supporting members are coupled to the housing. In addition, structures, such as elastic claws, engaged with the light guides may be provided integrally with the frame, and the structures may be used to assemble the light guides to the frame.

By the way, the intensity of light (amount of light) emitted from the image sensor unit to the object to be read is preferably uniform throughout the whole length in the longitudinal direction. It is also preferable that the tendency of the distribution of the intensity of light in the longitudinal direction not change even when the object to be read is displaced in the optical axis direction of the light condenser. In other words, it is preferable that the distribution in the longitudinal direction of the output from the image sensor unit be similar even when the distance between the object to be read and the image sensor unit is changed. However, when the supporting members include parts engaged so as to cover the surfaces of the light guides closer to the object to be read as described in Patent Literature 1, the intensity of light emitted to the object to be read may be locally changed by the parts, and the distribution in the longitudinal direction may be nonuniform. Furthermore, according to the configuration, the similarity of output of the image sensor unit may be broken when the distance between the object to be read and the image sensor unit is changed.

Particularly, in the configuration including a plurality of light guides (two in Patent Literature 1), the local change in the intensity of light caused by the supporting members becomes large when the positions in the longitudinal direction of the supporting members mounted on each light guide are the same in all of the light guides. Therefore, the extent of the nonuniformity in the distribution of the intensity of light in the longitudinal direction becomes large, and the breaking of the similarity of output becomes large when the distance between the object to be read and the image sensor unit is changed. Note that in the structure in which the structures engaged with the light guides are provided integrally with the frame, the same problems may occur depending on the positions of the structures.

CITATION LIST

Patent Literature

Patent Literature 1: International Publication Pamphlet No. WO 2011/080962

SUMMARY OF INVENTION

Technical Problem

In view of the circumstances, a problem to be solved by the present invention is to reduce nonuniformity of intensity of light (amount of light) caused by members or structures including parts engaged with light guides in an image sensor unit including a plurality of light guides. Another problem to be solved by the present invention is to reduce breaking of similarity of output even when the distance between an object to be read and the image sensor is changed.

Solution to Problem

To solve the problems, the present invention provides an image sensor unit that emits light to an object to be read and that reads light from the object to be read, the image sensor unit including: light sources; a plurality of rod-like light guides that shape light emitted by the light sources into a line and that emit the linear light elongated in a longitudinal direction to the object to be read; a plurality of pressing portions that overlap with a side, which faces the object to be read, of each of the plurality of light guides and that press a plurality of sections of each of the plurality of light guides from the side facing the object to be read; and an image sensor that detects the light emitted from the light guides and reflected by the object to be read, wherein the plurality of light guides are provided such that the longitudinal directions of the plurality of light guides are parallel to each other, and in a range in which the image sensor detects the light in the longitudinal direction, centers of the plurality of pressing portions that press one light guide of the plurality of light guides and centers of the plurality of pressing portions that press another light guide different from the one light guide are deviated in the longitudinal direction of the plurality of light guides.

Advantageous Effects of Invention

According to the present invention, in the image sensor unit including the plurality of light guides, the positions where the intensity of light (amount of light) locally decreases can be shifted in each light guide to thereby reduce the nonuniformity in the intensity of light (amount of light) caused by the supporting members that assemble the light guides to the frame. Furthermore, according to the present invention, the breaking of the similarity of output can be reduced even when the distance in the optical axis direction between the object to be read and the image sensor unit is changed.

BRIEF DESCRIPTION OF DRAWINGS

FIG. 12A is a plan view schematically illustrating an example of arrangement of pressing portions.

FIG. 12B is a plan view schematically illustrating a first comparative example of the arrangement of the pressing portions.

FIG. 12C is a plan view schematically illustrating a second comparative example of the arrangement of the pressing portions.

FIG. 13A is a graph illustrating output ratios of the example.

FIG. 13B is a graph illustrating output ratios of the comparative example.

FIG. 14A is a graph illustrating output ratios of the example.

DESCRIPTION OF EMBODIMENTS

Figure 1:
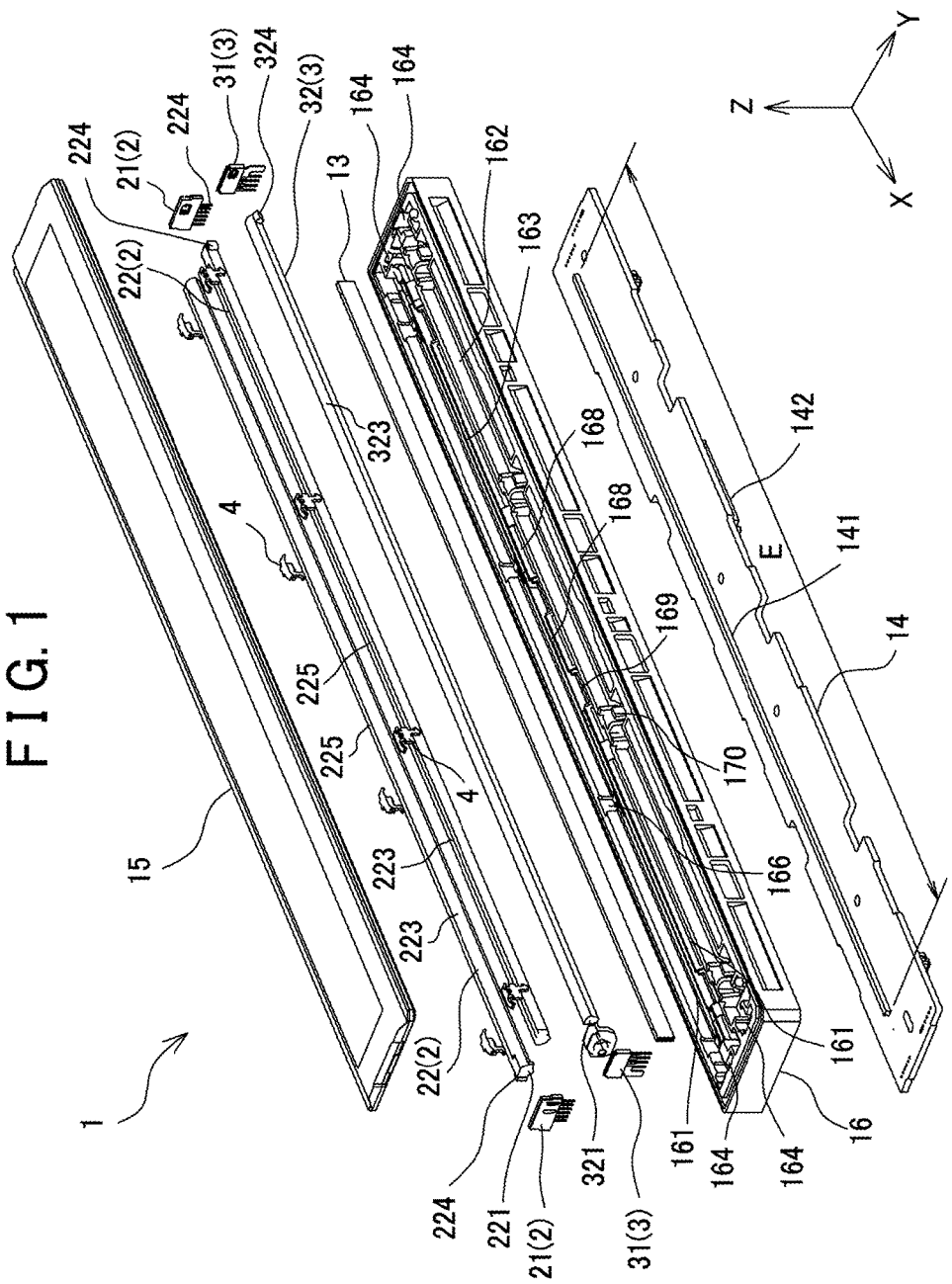
FIG. 1 is an exploded perspective view schematically illustrating a configuration example of an image sensor unit.

Hereinafter, an embodiment that can apply the present invention will be described in detail with reference to the drawings. An image sensor unit as well as a paper sheet distinguishing apparatus and an image reading apparatus in which the image sensor unit is applied are illustrated in the embodiment of the present invention. In the drawings, three-dimensional directions of the image sensor unit are indicated by arrows of X, Y, and Z. The X direction is a main-scan direction, the Y direction is a sub-scan direction, and the Z direction is a vertical direction. Note that a side closer to an object to be read P is an upper side in the vertical direction. The same applies to the directions of the members included in the image sensor unit. In the present invention, "light" includes not only visible light, but also electromagnetic waves in wavelength regions other than the visible light, such as infrared light and ultraviolet light.

<Image Sensor Unit>

Figure 2:
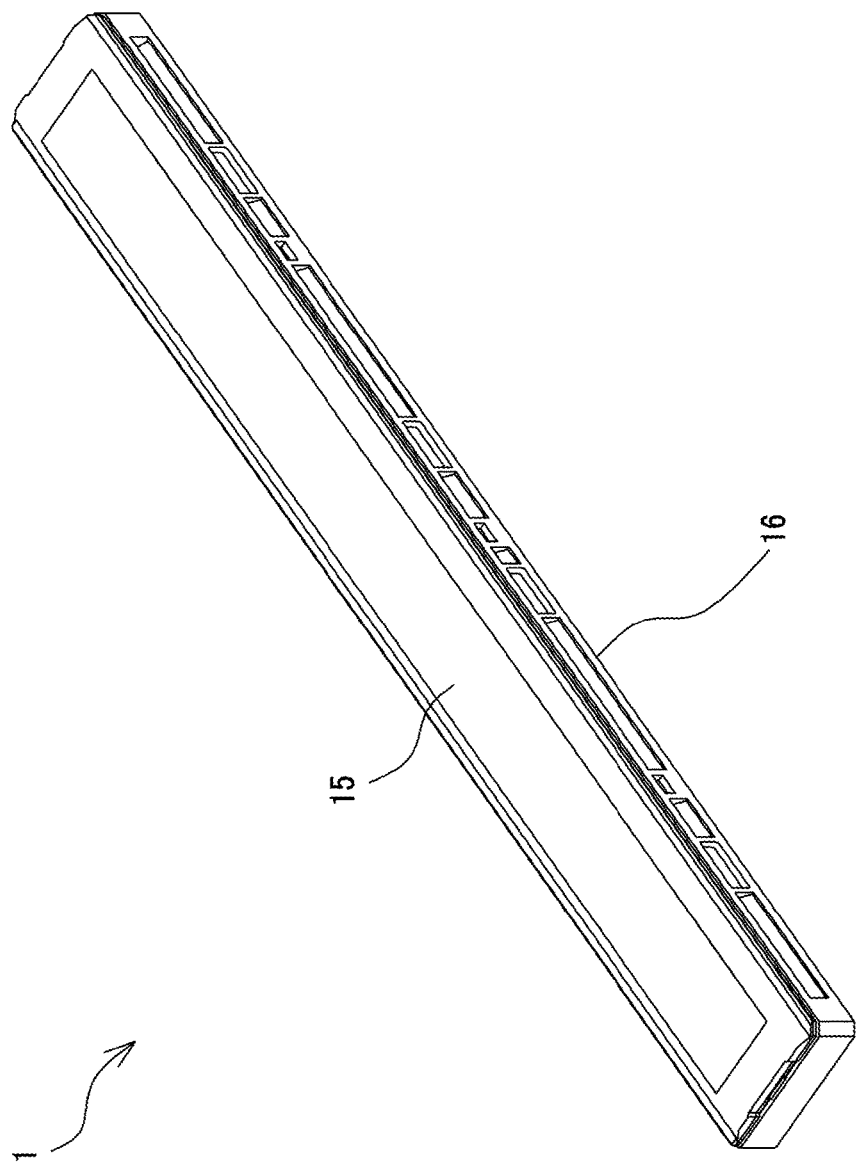
FIG. 2 is an external perspective view schematically illustrating the configuration example of the image sensor unit.

First, a configuration example of an image sensor unit 1 will be described with reference to FIGS. 1 and 2. FIG. 1 is an exploded perspective view schematically illustrating the configuration example of the image sensor unit 1. FIG. 2 is an external perspective view schematically illustrating the configuration example of the image sensor unit 1. The image sensor unit 1 according to the embodiment of the present invention emits light toward the object to be read P that moves in the sub-scan direction relative to the image sensor unit 1 and reads an image of the object be read P based on light from the object to be read P. The image sensor unit 1 according to the embodiment of the present invention corresponds to both types of reading that are reflection reading and transmission reading of the object to be read P. Two image sensor units 1 can be arranged to face each other to perform the transmission reading of the object to be read P and the reflection reading of both surfaces.

As illustrated in FIGS. 1 and 2, the image sensor unit 1 includes two sets of reflection reading light source portions 2, one set of transmission reading light source portions 3, a light condenser 13, a circuit board 14, a frame 16 as an example of a housing, a frame cover 15, and holding members 4.

Each set of the reflection reading light source portions 2 includes light sources 21 and a light guide 22 that shapes light emitted by the light sources 21 into a line (shapes the light into a line light source). Similarly, the transmission reading light source portions 3 include light sources 31 and a light guide 32 that shapes light emitted by the light sources 31 into a line. For the convenience of the description, the light guides will be distinguished by referring to the light guide 22 of the reflection reading light source portions 2 as a "first light guide 22" and referring to the light guide 32 of the transmission reading light source portions 3 as a "second light guide 32". When the light guides are simply referred to as "light guides 22 and 32", the light guides denote both the "first light guide 22" and the "second light guide 32".

The light sources 21 and 31 of the reflection reading light source portions 2 and the transmission reading light source portions 3 include, for example, light emitting elements that emit light in wavelength regions of red (R), green (G), blue (B), infrared light (Ir), and ultraviolet light (UV). The light emitting elements that emit the light in the wavelength regions can be various well-known LEDs. Note that the configurations of the light sources 21 and 31 are appropriately set according to specifications and the like of the image sensor unit 1, and the configurations are not particularly limited. Furthermore, the configuration (for example, bandwidth of emission wavelength) and the number of light emitting elements included in the light sources 21 and 31 are not particularly limited. For example, the light sources 21 and 31 may include all of the light emitting elements that emit the light in the wavelength regions or may include only part of the light emitting elements.

The light guides 22 and 32 are optical members that shape the light emitted by the light sources 21 and 31 into a line (shape the light into a line light source). The light guides 22 and 32 have rod-like shapes elongated in the main-scan direction and are integrally formed by a transparent material such as an acrylic resin material.

End surfaces of the light guides 22 and 32 in a longitudinal direction (main-scan direction) are provided with light incident surfaces 221 and 321 from which the light emitted by the light sources 21 and 31 enters. Side surfaces of the light guides 22 and 32 are provided with light diffusing surfaces 222 and 322 that diffuse the entered light and light emission surfaces 223 and 323 that emit the entered light toward a reading line O of the object to be read P (see FIGS. 8 and 10). Furthermore, positioning portions 224 and 225 for positioning the light guides 22 and 32 on the frame 16 are provided near end portions of the light guides 22 and 32 in the longitudinal direction. The positioning portions 224 and 225 have projection-like shapes protruding in the sub-scan direction. In addition, the first light guide 22 is provided with a pressed surface 225 pressed by pressing portions 41 of the holding members 4 described later coming into contact with the pressed surface 225. However, the second light guide 32 may not be provided with the pressed surface 225.

The light incident surfaces 221 and 321 may be provided on both end surfaces of the light guides 22 and 32 in the longitudinal direction or may be provided on one of the end surfaces. When the light incident surfaces 221 and 321 are provided on both end surfaces, the light sources 21 and 31 are arranged on each of both ends of the light guides 22 and 32 in the longitudinal direction, and two light sources 21 and two light sources 31 emit light to the light incident surfaces 221 and 321 on both end surfaces, respectively. When the light incident surfaces 221 and 321 are provided on only one of the end surfaces, one light source 21 and one light source 31 are arranged on one of the end portions of the light guides 22 and 32 (end portion on the side provided with the light incident surfaces 221 and 321). One light source 21 and one light source 31 emit light (linear light elongated in the main-scan direction) to the light incident surfaces 221 and 321 provided on the end surfaces of the light guides 22 and 32.

The light emission surfaces 223 and 323 have shapes long and thin in the main scan direction, such as band-like shapes. The length of the light emission surfaces 223 and 323 in the main-scan direction is set according to the width (dimension in the main-scan direction) of the object to be read P handled by the image sensor unit 1. For example, when the object to be read P in an A3 size is to be read, the length of the light emission surfaces 223 and 323 is set to a dimension according to the width of the object to be read P in the A3 size. The light emission surfaces 223 and 323 are formed into, for example, curved surfaces convex toward the reading line O of the object to be read P as viewed in the main-scan direction so that the light is emitted toward the reading line O (see FIG. 10) of the object to be read P.

Note that the light emission surface 223 of the first light guide 22 is formed in a shape that allows emitting the light (linear light) in a direction inclined to one side in the vertical direction as viewed in the main-scan direction. The light emission surface 223 of the first light guide 22 is provided at a position close to one side in the sub-scan direction as viewed from the top. On the other hand, the light emission surface 323 of the second light guide 32 is formed in a shape that allows emitting the light (linear light) directly above (in a direction parallel to the vertical direction). When the second light guide 32 does not include the pressed surface 225, the entire upper side of the second light guide 32 (for example, entire range that can be viewed from the top) is the light emission surface 323.

The light diffusing surfaces 222 and 322 also have shapes long and thin in the main scan direction (for example, band shapes). The light diffusing surfaces 222 and 322 are provided on, for example, opposite sides (lower sides) of the light emission surfaces 223 and 323 (see FIGS. 8 and 10). Diffusing patterns for diffusing the entered light are provided on the light diffusing surfaces 222 and 322. Examples of the diffusing patterns include dot patterns printed by a paint that diffuses light.

The pressed surface 225 is provided close to one side in the sub-scan direction as viewed from the top (however, on the opposite side of the side provided with the light emission surface 223). The pressed surface 225 is a surface facing upward (toward the object to be read P) when the first light guide 22 is assembled to the frame 16, and the pressed surface 225 is a surface with which projection portions 411 of the pressing portions 41 of the holding members 4 described later come into contact. In the present embodiment, the pressed surface 225 is formed in a band shape elongated in the main-scan direction, and the pressed surface 225 and the light emission surface 223 are arranged in a line adjacent to each other in the sub-scan direction. However, the pressed surface 225 may be provided throughout the whole length in the main-scan direction or may be partially provided only at sections where the pressing portions 41 of the holding members 4 overlap. As described above, the pressed surface 225 is provided only on the first light guide 22 and is not provided on the second light guide 32 in the present embodiment. However, the pressed surface 225 may also be provided on the second light guide 32.

The light condenser 13 is an optical member that focuses the light from the object to be read P on the surface of an image sensor 141 (described later). The light condenser 13 can be, for example, a rod-lens array including a plurality of imaging elements (rod lenses) of an erect equal magnification imaging type linearly arranged in the main-scan direction. Note that it is only necessary that the imaging elements be linearly arranged in the light condenser 13. For example, the imaging elements may be arranged in a plurality of lines in the light condenser 13. Note that the light condenser 13 can be an optical member with various conventionally well-known light condensing functions, such as various micro-lens arrays.

The circuit board 14 has a rectangular shape elongated in the main-scan direction. The image sensor 141 is provided on an upper surface of the circuit board 14, and the light sources 21 and 31 are mounted on the upper surface of the circuit board 14. A connector 142 for electrical connection to the outside is mounted on a lower surface of the circuit board 14.

The image sensor 141 detects the light focused by the light condenser 13, converts the light into an electric signal, and outputs the electric signal. The image sensor 141 is mounted with a light receiving surface facing upward to allow receiving (detecting) the light from the light condenser 13. The image sensor 141 can be, for example, an image sensor IC array. The image sensor IC array includes a plurality of image sensor ICs linearly mounted in the main-scan direction on the upper surface of the circuit board 14. The image sensor ICs include a plurality of light receiving elements (may also be referred to as photoelectric conversion elements) corresponding to the resolution of reading by the image sensor unit 1. In this way, the image sensor 141 includes a plurality of image sensor ICs (light receiving elements) linearly arranged in the main-scan direction. Note that it is only necessary that the plurality of image sensor ICs be linearly arranged in the image sensor 141, and the other configurations are not particularly limited. For example, the image sensor ICs may be arranged in a plurality of lines to form a staggered arrangement. Note that the image sensor ICs included in the image sensor 141 can be various conventionally well-known image sensor ICs. Furthermore, a range indicated by reference sign E in FIG. 1 is a range in the main-scan direction in which the image sensor 141 is provided and is a range in which the image sensor unit 1 reads the object to be read P. Hereinafter, the range E may be referred to as an "effective reading range E".

The light sources 21 and 31 are mounted on positions that allow emitting the light to the light incident surfaces 221 and 321 of the light guides 22 and 32. For example, in a configuration illustrated in FIG. 1, the light incident surface 221 is provided on one of the end surfaces of each of the first light guides 22, and the light incident surfaces 321 are provided on both end surfaces of the second light guide 32. According to the configuration, a total of four light sources 21 and 31 are mounted on the upper surface of the circuit board 14 to allow emitting the light to the light incident surfaces 221 and 321 of the respective light guides 22 and 32. In this case, one light source 21 is mounted on a position that allows emitting the light to the light incident surface 221 of one of the first light guides 22, and the other light source 21 is mounted on a position that allows emitting the light to the light incident surface 221 of the other first light guide 22. The remaining two light sources 31 are respectively mounted on positions that allow emitting the light to the light incident surfaces 321 on both end surfaces of the second light guide 32.

The frame 16 is an example of a housing of the image sensor unit 1. The frame 16 has, for example, a rectangular solid shape elongated in the main-scan direction and is integrally formed by a light-blocking resin material. The resin material can be polycarbonate colored in black.

Figure 6:
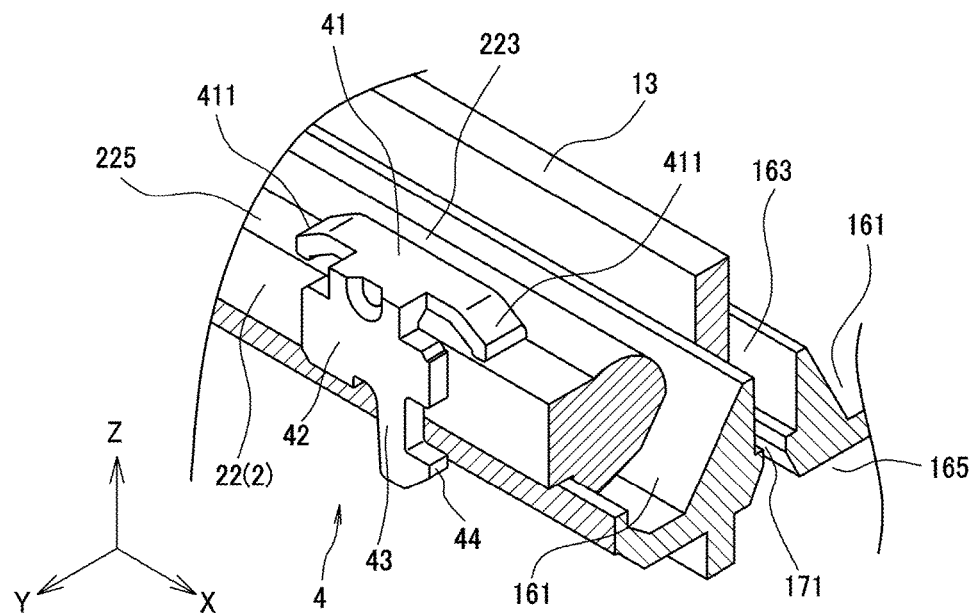
FIG. 6 is a perspective view schematically illustrating a state in which the holding member holds a light guide.

The frame 16 is provided with: three light guide housing chambers 161 and 162; light source housing chambers 164, the number of which corresponds to the number of light sources 21 and 31; a light condenser housing chamber 163; and a circuit board housing chamber 165 (see FIG. 6). The two first light guides 22 are housed in the two light guide housing chambers 161, respectively, among the three light guide housing chambers 161 and 162. The second light guide 32 is housed in the remaining one light guide housing chamber 162. The light condenser housing chamber 163 is a region where the light condenser 13 is housed. The light source housing chambers 164 are regions where the light sources 21 and 31 are housed. The circuit board housing chamber 165 is a region where the circuit board 14 is housed.

For the convenience of the description, the light guide housing chambers 161 that house the first light guides 22 will be referred to as "first light guide housing chambers 161", and the light guide housing chamber 162 that houses the second light guide 32 will be referred to as a "second light guide housing chamber 162". As described above, the image sensor unit 1 according to the present embodiment includes two sets of reflection reading light source portions 2 and one set of transmission reading light source portions 3. Therefore, the frame 16 is provided with two first light guide housing chambers 161 and one second light guide housing chamber 162.

Each of the two first light guide housing chambers 161 and the one second light guide housing chamber 162 is a groove-like region elongated in the main-scan direction in which the upper side is open. The light condenser housing chamber 163 is also a groove-like region elongated in the main-scan direction in which the upper side is open. The longitudinal directions of the housing chambers are parallel to the main-scan direction and are parallel to each other. One of the first light guide housing chambers 161, the light condenser housing chamber 163, the other first light guide housing chamber 161, and the second light guide housing chamber 162 are provided to line up in the described order from one side in the sub-scan direction (see FIGS. 5 and 6).

The light condenser housing chamber 163 is provided between the two first light guide housing chambers 161. Partition walls 168 are provided between each of the two first light guide housing chambers 161 and the light condenser housing chamber 163. The partition walls 168 partition the two first light guide housing chambers 161 and the light condenser housing chamber 163. In other words, a region between the two partition walls 168 is the light condenser housing chamber 163, and regions outside of the two partition walls 168 in the sub-scan direction are the first light guide housing chambers 161. Adhesive filling portions 169 are provided on a plurality of sections of the partition walls 168. The adhesive filling portions 169 are parts for providing an adhesive (loading an adhesive) that bonds the light condenser 13 to the frame 16, and the adhesive filling portions 169 have a notch-like shape in which the upper side is open. Note that in the configuration illustrated in the present embodiment, the plurality of adhesive filling portions 169 are provided on one of the two partition walls 168.

Furthermore, locking concave portions 166 for locking the holding members 4 are provided on an inner circumferential surface of each of the two first light guide housing chambers 161. In the present embodiment, the locking concave portions 166 are provided on a surface farther from the light condenser housing chamber 163 (surface facing the partition walls 168) in the inner circumferential surfaces of each of the first light guide housing chambers 161 and are not provided on a surface closer to the light condenser housing chamber 163 (side surfaces of the partition walls 168). Note that the configuration of the locking concave portions 166 and the positions of the locking concave portions 166 in the main-scan direction will be described later.

The light source housing chambers 164 communicate with end portions of the first light guide housing chambers 161 and the second light guide housing chamber 162 in the longitudinal direction. The circuit board housing chamber 165 is a region in which the lower side is open, and the circuit board housing chamber 165 is provided on the lower sides of the first light guide housing chambers 161, the second light guide housing chamber 162, the light condenser housing chamber 163, and the light source housing chambers 164. Each of the plurality of light source housing chambers 164 and the circuit board housing chamber 165 communicate with each other through openings (through holes) to allow electrically connecting the light sources 21 and 31 housed in the light source housing chambers 164 and the circuit board 14 housed in the circuit board housing chamber 165. Furthermore, an optical path 171 is provided between the light condenser housing chamber 163 and the circuit board housing chamber 165. The optical path 171 is a slit-like opening (through hole) penetrating in the vertical direction and elongated in the main-scan direction. The light condensed by the light condenser 13 passes through the optical path 171 and enters the image sensor 141 provided on the upper surface of the circuit board 14.

In addition, the frame 16 is provided with attachment portions and the like, not illustrated, for attaching a paper sheet distinguishing apparatus 7 and an image reading apparatus 8 (described later). Note that the configuration of the attachment portions is not particularly limited. It is only necessary that the attachment portions be capable of attaching the frame 16 to the paper sheet distinguishing apparatus 7 and the image reading apparatus 8.

The frame cover 15 is a plate-like member attached to the upper side of the frame 16. The entire frame cover 15 is transparent, or part of the frame cover 15 is transparent. The transparent part of the frame cover 15 is formed from, for example, a transparent resin material such as an acrylic resin. The frame cover 15 has a function of protecting each member housed in the frame 16, a function of preventing foreign matters such as dust from entering the frame 16, a function of maintaining the flat surface of the object to be read P, and the like. Note that when the image sensor unit 1 is incorporated into an apparatus, such as a flat-bed scanner, including another member (for example, a platen glass) having the functions of the frame cover 15, the frame cover 15 may not be provided.

Figure 3:
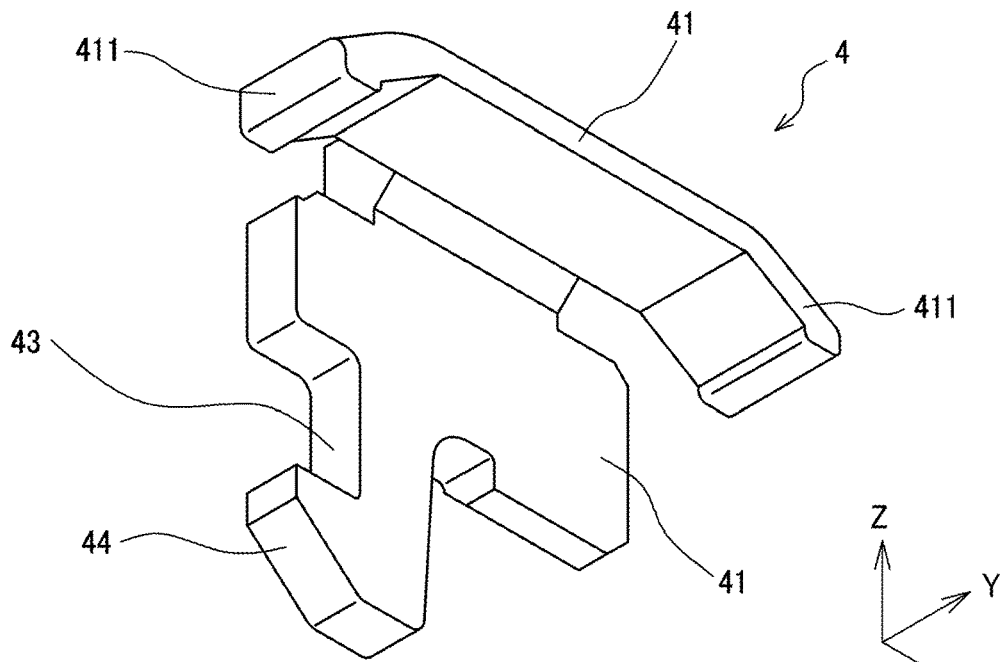
FIG. 3 is an external perspective view schematically illustrating a configuration example of a supporting member.
Figure 4:
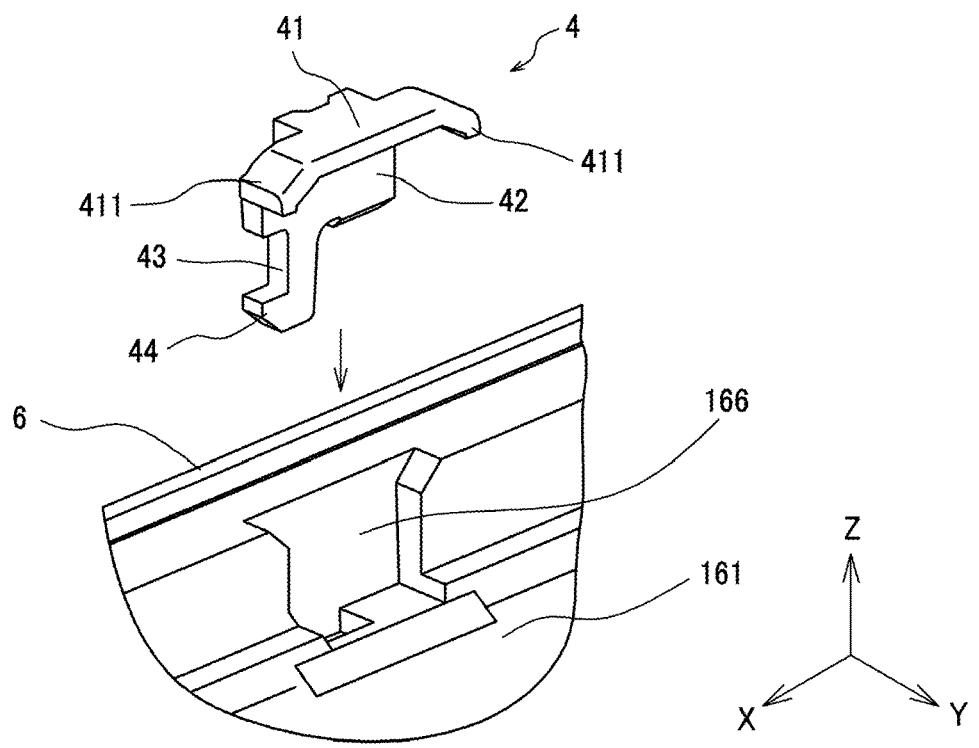
FIG. 4 is a perspective view schematically illustrating a configuration example of a locking concave portion.
Figure 5:
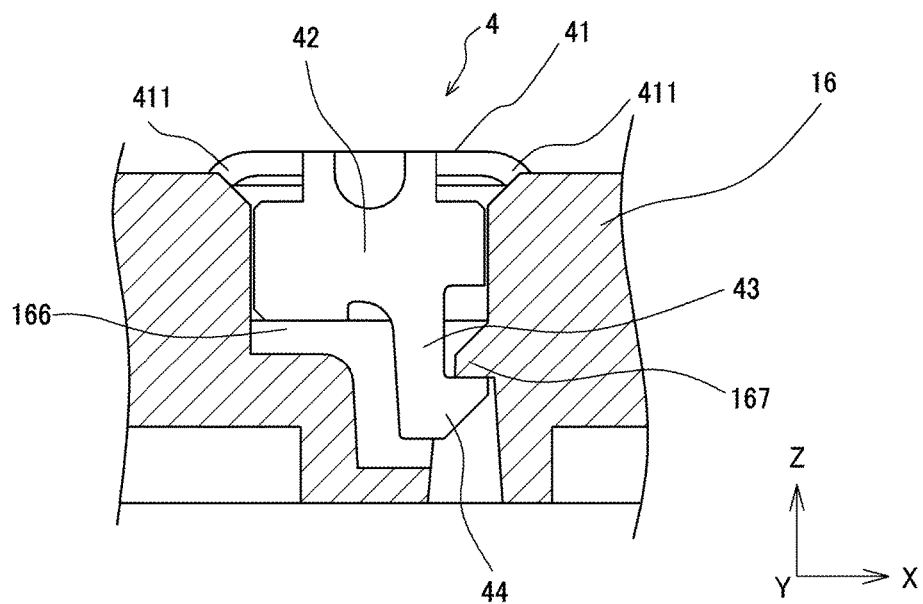
FIG. 5 is a cross-sectional view schematically illustrating a state in which a holding member is engaged with a locking portion.

Here, configuration examples of the holding member 4 and the locking concave portion 166 will be described with reference to FIGS. 3 to 6. FIG. 3 is an external perspective view schematically illustrating a configuration example of the holding member 4. FIG. 4 is a perspective view schematically illustrating a configuration example of the locking concave portion 166. FIG. 5 is a cross-sectional view schematically illustrating a state in which the holding member 4 is engaged with the locking concave portion 166 as viewed in the sub-scan direction. FIG. 6 is a perspective view schematically illustrating a holding structure of the first light guide 22 based on the holding member 4.

As illustrated in FIGS. 3 to 6, the holding member 4 includes the pressing portion 41, a side plate portion 42, an elastic arm portion 43, and a locking claw portion 44. The holding member 4 has a substantially "L" shape as viewed in the main-scan direction. Here, the side plate portion 42, the elastic arm portion 43, and the locking claw portion 44 correspond to one of a vertical line and a horizontal line of the "L" shape, and the pressing portion 41 corresponds to the other. Therefore, the pressing portion 41 extends from the upper end of the side plate portion 42 in the sub-scan direction as viewed in the main-scan direction. The holding member 4 is integrally formed by a resin material such as POM. Note that the color of the holding member 4 is not particularly limited.

The pressing portion 41 overlaps with the upper side of the pressed surface 225 of the first light guide 22 when assembled to the image sensor unit 1, and the pressing portion 41 presses the first light guide 22 from the upper side. The pressing portion 41 has a strip-like or rod-like shape elongated in the main-scan direction as viewed from the top. The projection portions 411 protruding downward are provided on both ends of the pressing portion 41 in the longitudinal direction (main-scan direction). For example, as illustrated in FIGS. 3 and 4, both ends of the pressing portion 41 in the longitudinal direction are curved or bent downward, and the curved or bent parts are the projection portions 411. Projection-like structures protruding downward may be provided as the projection portions 411, on the lower surfaces of both ends of the pressing portion 41 in the longitudinal direction. The projection portions 411 come into contact with the pressed surface 225 of the first light guide 22. Furthermore, both ends of the pressing portion 41 in the longitudinal direction can be elastically deformed and warped upward.

The side plate portion 42 is a planar part. Note that the holding member 4 is used in a direction such that the thickness direction of the side plate portion 42 is parallel to the sub-scan direction. The main-scan direction dimension (width) and the main-scan direction dimension (thickness) of the side plate portion 42 are set to dimensions that allow insertion into the locking concave portion 166 of the frame 16 described later. The elastic arm portion 43 is an arm-like part extending downward from the side plate portion 42. The elastic arm portion 43 can be elastically deformed to be curved in the main-scan direction. The locking claw portion 44 is a projection-like part protruding in the main-scan direction from the tip (lower end) of the elastic arm portion 43. The locking claw portion 44 is engaged with a locked portion 167 of the locking concave portion 166 of the frame 16 described later when the holding member 4 is mounted on the frame 16.

As illustrated in FIGS. 4 and 5, the locking concave portion 166 is provided on the inner circumferential surface of the first light guide housing chamber 161. The main-scan direction dimension (width) and the sub-scan direction dimension (depth) of the locking concave portion 166 are set to dimensions that allow insertion of the side plate portion 42 of the holding member 4. The upper side of the locking concave portion 166 is also open so that the holding member 4 can be inserted from the upper side. The locked portion 167 with which the locking claw portion 44 of the holding member 4 is engaged is provided on the bottom portion of the locking concave portion 166. The locked portion 167 can be, for example, a projection protruding in the main-scan direction from the inner circumferential surface of the locking concave portion 166.

When the elastic arm portion 43 and the side plate portion 42 of the holding member 4 are inserted into the locking concave portion 166 from the upper side, the locking claw portion 44 comes into contact with the locked portion 167. When the elastic arm portion 43 and the side plate portion 42 are inserted more deeply, the elastic arm portion 43 is elastically deformed to be bent in the main-scan direction, and the locking claw portion 44 provided at the tip (lower end) of the elastic arm portion 43 climbs over the locked portion 167 provided on the locking concave portion 166. As illustrated in FIG. 5, the locking claw portion 44 is then engaged with the lower side of the locked portion 167. Therefore, the elastic arm portion 43 and the side plate portion 42 of the holding member 4 cannot slip out upward from the locking concave portion 166, and the elastic arm portion 43 and the side plate portion 42 are held while being inserted into the locking concave portion 166.

When the first light guide 22 is housed in the first light guide housing chamber 161, the pressed surface 225 provided on the first light guide 22 faces upward and is exposed. Therefore, when the holding member 4 is inserted into the locking concave portion 166 from the upper side, the pressing portion 41 of the holding member 4 overlaps with the upper side of the pressed surface 225 of the first light guide 22. Furthermore, the projection portion 411 provided on the pressing portion 41 of the holding member 4 comes into contact with the pressed surface 225 of the first light guide 22. In addition, both ends of the pressing portion 41 in the longitudinal direction are elastically deformed to be warped upward, and the pressing portion 41 urges and presses the first light guide 22 downward. According to the configuration, the side surface of the first light guide 22 is held while being in contact with the inner circumferential surface of the first light guide housing chamber 161, and the first light guide 22 is held while being positioned relative to the frame 16.

(Assembly Configuration of Image Sensor Unit)

Figure 7:
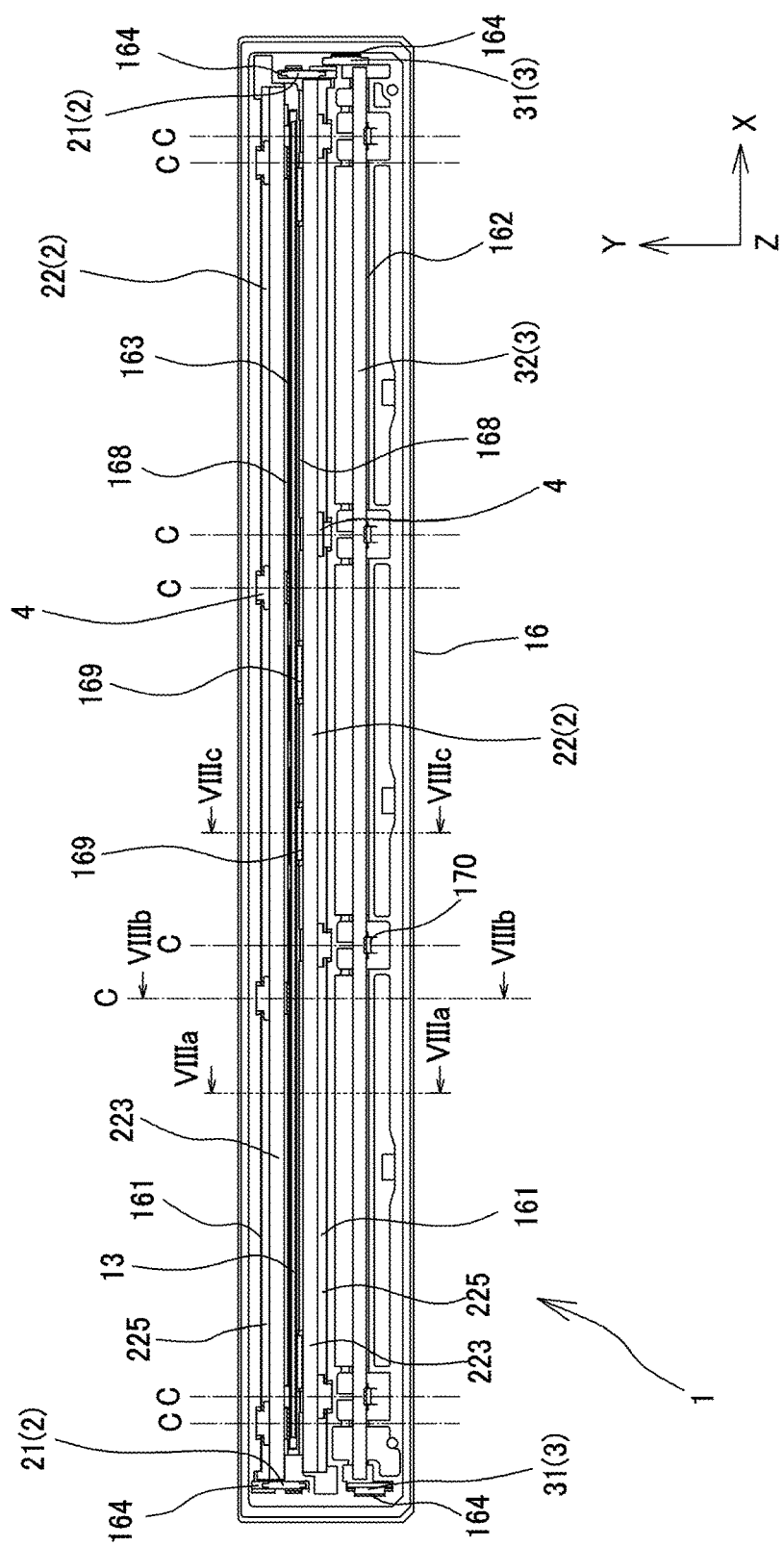
FIG. 7 is a plan view schematically illustrating a configuration example of the image sensor unit.
Figure 8A:
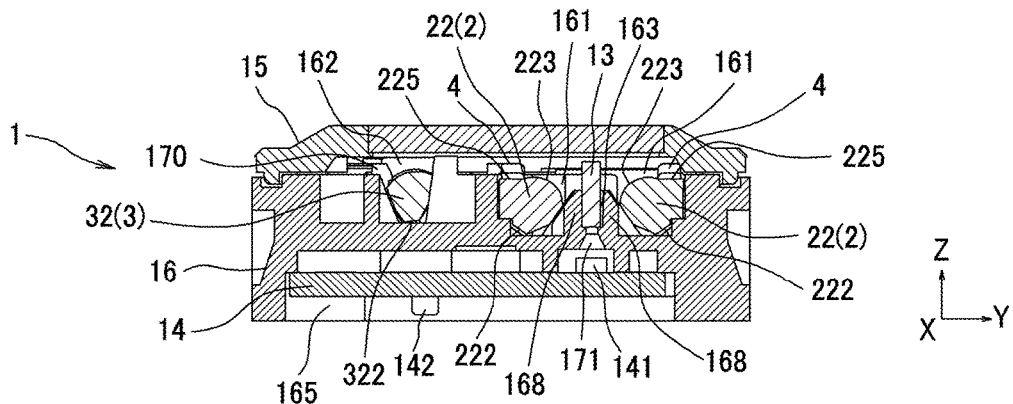
FIG. 8A is a cross-sectional view schematically illustrating the configuration example of the image sensor unit and is a cross-sectional view taken along line VIIIa-VIIIa of FIG. 7.
Figure 8B:
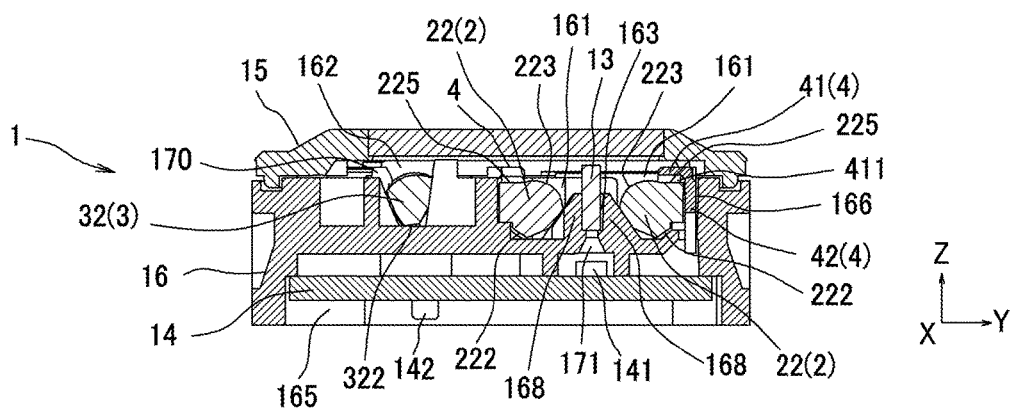
FIG. 8B is a cross-sectional view schematically illustrating the configuration example of the image sensor unit and is a cross-sectional view taken along line VIIIb-VIIIb of FIG. 7.
Figure 8C:
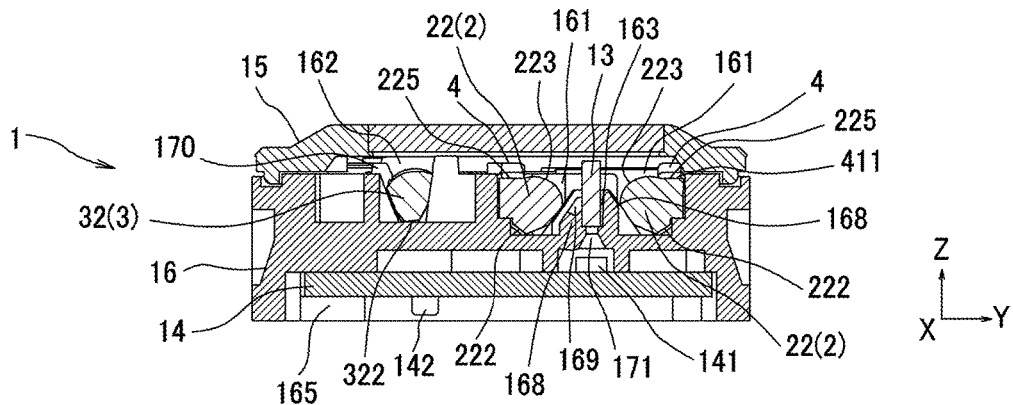
FIG. 8C is a cross-sectional view schematically illustrating the configuration example of the image sensor unit and is a cross-sectional view taken along line VIIIc-VIIIc of FIG. 7.

Next, an assembly configuration of the image sensor unit 1 will be described. FIG. 7 is a plan view schematically illustrating a state in which the image sensor unit 1 is assembled. Note that the frame cover 15 is not illustrated in FIG. 7. Alternate short and long dash lines C in FIG. 7 indicate positions of centers of the pressing portions 41 of the holding members 4 in the main-scan direction. FIG. 8A is a cross-sectional view taken along line VIIIa-VIIIa of FIG. 7, illustrating a cross section of a position without the holding members 4 and without the adhesive filling portions 169. FIG. 8B is a cross-sectional view taken along line VIIIb-VIIIb of FIG. 7, illustrating a cross section of a position where the first light guides 22 are pressed and held by the holding members 4. FIG. 8C is a cross-sectional view taken along line VIIIc-VIIIc of FIG. 7, illustrating a cross section of a position provided with the adhesive filling portion 169.

As illustrated in FIGS. 7 and 8, the first light guide 22 is housed in each of the two first light guide housing chambers 161. In this case, the sides provided with the pressed surfaces 225 face sides farther from the partition walls 168 (that is, sides farther from the light condenser housing chamber 163 and sides provided with the locking concave portions 166) as viewed from the top. Furthermore, sides provided with the light emission surface 223 face sides of the partition walls 168 (sides closer to the light condenser housing chamber 163). In this state, the elastic arm portions 43 and the side plate portions 42 of the holding members 4 are inserted into the locking concave portions 166 from the upper sides. Note that the upper sides of the locking concave portions 166 provided on the inner circumferential surfaces of the first light guide housing chambers 161 are also open as described above. Therefore, the openings of the locking concave portions 166 are exposed to the upper sides of the frame 16 even in the state in which the first light guides 22 are housed in the first light guide housing chambers 161. Therefore, the holding members 4 can be inserted into the locking concave portions 166 from the upper sides.

When the holding members 4 are inserted into the locking concave portions 166, the locking claw portions 44 of the holding members 4 are engaged with the locked portions 167 of the locking concave portions 166, and the holding members 4 are held in the state in which the holding members 4 cannot slip out from the locking concave portions 166 as described above. The pressing portions 41 overlap with the upper sides of the pressed surfaces 225 of the first light guides 22, and the projection portions 411 come into contact with the pressed surfaces 225 of the first light guides 22. Therefore, the first light guides 22 are housed in the first light guide housing chambers 161 and held.

The second light guide 32 is housed in the second light guide housing chamber 162. Holding portions 170 that hold the second light guide 32 are integrally provided on the frame 16. The second light guide 32 housed in the second light guide housing chamber 162 is held and positioned by the holding portions 170 provided integrally with the frame 16. The holding portions 170 can be various well-known elastic claws. Note that the specific configuration is not limited as long as the holding portions 170 can hold the second light guide 32 housed in the second light guide housing chamber 162. The locking concave portions 166 may be provided on the second light guide housing chamber 162, and the holding members 4 may press and hold the second light guide 32.

The light condenser 13 is housed in the light condenser housing chamber 163 and bonded to the frame 16 by an adhesive. Specifically, the light condenser 13 is housed in the light condenser housing chamber 163, and an ultraviolet curable adhesive is poured from the upper side into the notch-like adhesive filling portions 169 provided on the partition walls 168 (or the adhesive is loaded). Then, ultraviolet light is emitted to the poured ultraviolet curable adhesive to cure the adhesive. As a result, the light condenser 13 is bonded and fixed to the frame 16. The partition walls 168 are provided with the plurality of adhesive filling portions 169, and the light condenser 13 is bonded to the frame 16 by the adhesive at a plurality of sections. Note that the adhesive for bonding the light condenser 13 can be various well-known ultraviolet curable adhesives.

The plurality of image sensor ICs are mounted on the upper surface of the circuit board 14 to construct the image sensor 141. The light sources 21 and 31 of the reflection reading light source portions 2 and the transmission reading light source portions 3 are also mounted on the upper surface of the circuit board 14. The circuit board 14 is then housed in the circuit board housing chamber 165 of the frame 16 from the lower side. When the circuit board 14 is housed in the circuit board housing chamber 165, the light sources 21 of the reflection reading light source portions 2 are arranged at positions that allow emitting the light to the light incident surfaces 221 of the first light guides 22 housed in the first light guide housing chambers 161. Similarly, the light sources 31 of the transmission reading light source portions 3 are arranged at positions that allow emitting the light to the light incident surfaces 321 of the second light guide 32 housed in the second light guide housing chamber 162. The image sensor 141 provided on the circuit board 14 is positioned on the optical axis of the light condenser 13. Note that the optical axis of the light condenser 13 is a plane instead of a line.

The first light guides 22 are housed in the first light guide housing chambers 161, the second light guide 32 is housed in the second light guide housing chamber 162, and the light condenser 13 is housed in the light condenser housing chamber 163. In this state, the frame cover 15 is attached to the upper side of the frame 16.

<Position of Holding Member>

Next, the position of the pressing portion 41 of the holding member 4 in the main-scan direction will be described with reference to FIG. 9. FIG. 9 is a plan view schematically illustrating the position of the pressing portion 41 of the holding member 4 in the main-scan direction.

As described above, the light emission surfaces 223 and the pressed surfaces 225 of the first light guides 22 face upward (toward the object to be read P) and are exposed from the first light guide housing chambers 161. The pressing portions 41 of the holding members 4 overlap with the upper sides of the pressed surfaces 225 of the first light guides 22. That is, the pressing portions 41 of the holding members 4 exist on the upper sides near the light emission surfaces 223 of the first light guides 22. Therefore, the intensity of the light emitted to the reading line O (object to be read P) is locally changed at positions corresponding to the pressing portions 41 when, for example, part of the light emitted from the light emission surfaces 223 of the first light guides 22 is blocked by the holding members 4. In this way, the distribution in the main-scan direction of the intensity of the light emitted to the reading line O becomes nonuniform due to the pressing portions 41 locally existing in the main-scan direction. Furthermore, according to the configuration, the similarity of output of the image sensor 141 may be broken when the object to be read P is displaced in the vertical direction relative to the image sensor unit 1. Particularly, the image sensor unit 1 includes the plurality of first light guides 22 in the present embodiment. According to the configuration, if the main-scan direction positions of the pressing portions 41 overlapping with each of the plurality of first light guides 22 are the same, the positions in the main-scan direction where the intensity of light is locally changed by the pressing portions 41 overlap with each other. Therefore, the distribution in the main-scan direction of the intensity (amount of light) of the light (linear light elongated in the main-scan direction) emitted to the reading line O easily becomes more nonuniform. Similarly, when the object to be read P is displaced in the vertical direction, the similarity of output of the image sensor 141 is more easily broken.

Therefore, the pressing portions 41 of the holding members 4 that press and hold each of the plurality of first light guides 22 are provided at positions different from each other in the main-scan direction. In the present embodiment, the image sensor unit 1 includes two first light guides 22 provided across the light condenser 13, and each of the two first light guides 22 is pressed and held by a plurality of holding members 4. In this configuration, the main-scan direction positions of the pressing portions 41 of the two closest holding members 4 across the light condenser 13 are shifted. In other words, the position in the main-scan direction of the pressing portion 41 of one arbitrary holding member 4 of the plurality of holding members 4 that hold one first light guide 22 and the position in the main-scan direction of the pressing portion 41 of another holding member 4 nearest (particularly, smallest distance in the main-scan direction) to the one arbitrary holding member 4 among the plurality of holding members 4 that hold the other first light guide 22 are shifted. In all of the first light guides 22, at least the pressing portions 41 of the holding members 4 provided in the range (in the range in the main-scan direction) of the effective reading range E among all of the holding members 4 that press and hold the respective first light guides 22 are provided to fulfill such a positional relationship. As described above, the effective reading range E is a range in which the image sensor 141 exists, and more accurately, the effective reading range E is a range in which the light receiving elements of the image sensor ICs exist to detect the light from the object to be read P (see FIGS. 1 and 12).

When there are holding members 4x (see FIG. 12) provided outside of the range of the effective reading range E in the main-scan direction, the pressing portions 41 of the holding members 4x may not fulfill the positional relationship. For example, when the pressing portions 41 of the holding members 4x positioned at the end portions in the main-scan direction are provided outside of the range of the effective reading range E, the pressing portions 41 of the holding members 4x may not fulfill the positional relationship. In short, it is only necessary that the pressing portions 41 of the holding members 4 provided in the range of the effective reading range E be provided to fulfill the positional relationship when the image sensor unit 1 is assembled. This is because the local change in the intensity of the emitted light does not affect (or hardly affects) the reading of the object to be read P outside of the range of the effective reading range E. However, the pressing portions 41 of the holding members 4x outside of the range of the effective reading range E may fulfill the positional relationship.

Figure 9A:
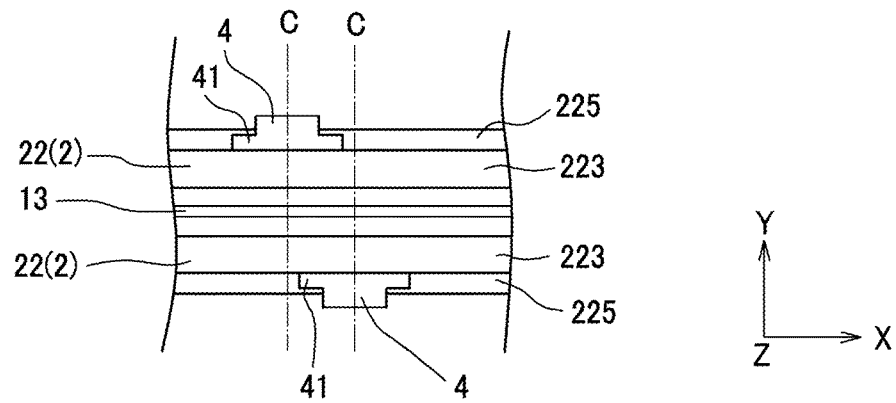
FIG. 9A is a plan view schematically illustrating an arrangement mode (1) of the holding member.
Figure 9B:
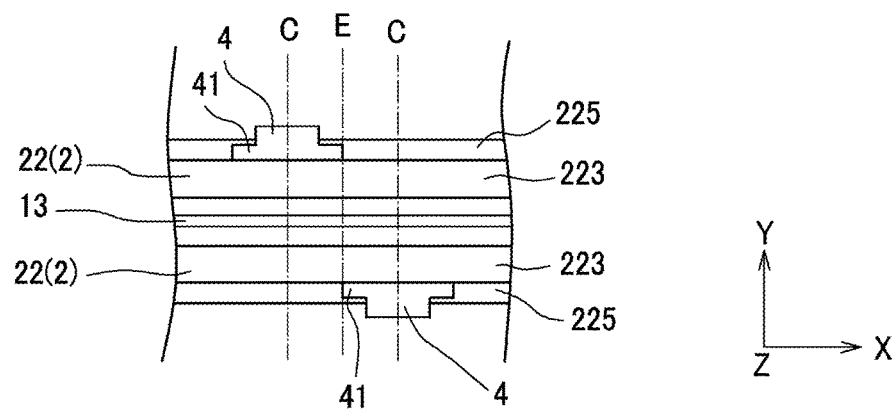
FIG. 9B is a plan view schematically illustrating an arrangement mode (2) of the holding member.
Figure 9C:
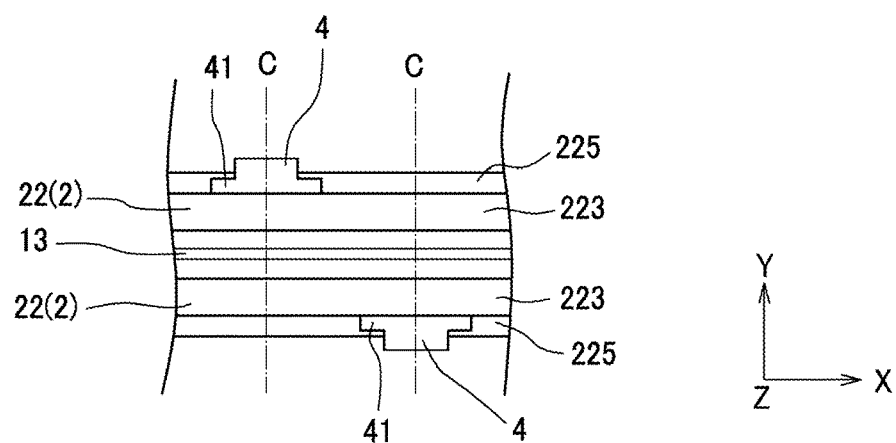
FIG. 9C is a plan view schematically illustrating an arrangement mode (3) of the holding member.

Examples of the mode of shifting the one arbitrary holding member 4 and another holding member 4 in the main-scan direction include the following three modes. (1) As illustrated in FIG. 9A, the positions of the centers C (here, center C positions in the main-scan direction) of the pressing portions 41 of the one arbitrary holding member 4 and the other holding member 4 are shifted in the main-scan direction. However, part of the holding members 4 overlaps as viewed in the sub-scan direction. (2) As illustrated in FIG. 9B, the position in the main-scan direction of one of the end surfaces in the main-scan direction of the pressing portion 41 of the one arbitrary holding member 4 and the position in the main-scan direction of the end surface on the opposite side in the main-scan direction of the pressing portion 41 of the other holding member 4 coincide. Therefore, as viewed in the sub-scan direction, the pressing portion 41 of the one arbitrary holding member 4 and the pressing portion 41 of the other holding member 4 are continuously provided in the main-scan direction. In FIG. 9B, the alternate short and long dash line E indicates the positions of the end surfaces of the pressing portions 41 in the main-scan direction. (3) As illustrated in FIG. 9C, the pressing portion 41 of the one arbitrary holding member 4 and the pressing portion 41 of the other holding member 4 are provided not to overlap as viewed in the sub-scan direction (away from each other as viewed in the main-scan direction).

According to the configurations, the positions of the sections in the main-scan direction where the intensity of light is locally changed due to the pressing portions 41 of the holding members 4 can be different from each other in one of the first light guides 22 and the other first light guide 22. This can prevent the nonuniformity of the distribution in the main-scan direction of the total intensity of the light emitted from the plurality of first light guides 22. Furthermore, according to the configurations, the breaking of the similarity of output of the image sensor 141 can be reduced when the object to be read P is displaced in the vertical direction relative to the image sensor unit 1. Note that the modes (1) to (3) may be mixed in one image sensor unit 1.

Note that the extent of the deviation between the one arbitrary holding member 4 and the other holding member 4 in the main-scan direction increases in the order of the modes (1), (2), and (3). In the present embodiment, it is only necessary that the mode be the mode (1) illustrated in FIG. 9A. However, the mode may be the mode (2) illustrated in FIG. 9B or the mode (3) illustrated in FIG. 9C. The advantageous effects can be attained in any of the modes (1), (2), and (3).

It is also preferable that the adhesive filling portions 169 provided on the partition walls 168 have the positional relationship relative to the pressing portions 41 of the holding members 4. More specifically, it is preferable that the positions in the main-scan direction of the centers C of the adhesive filling portions 169 and the pressing portions 41 of the holding members 4 be deviated from each other. One of the end surfaces in the main-scan direction of the adhesive filling portion 169 and the end surface on the opposite side in the main-scan direction of the pressing portion 41 of one holding member 4 of the plurality of holding members 4 may coincide as viewed in the sub-scan direction. Furthermore, the adhesive filling portion 169 and the pressing portion 41 of the holding member 4 may be provided without overlapping as viewed in the sub-scan direction.

Although the holding members 4 that are members separate from the frame 16 are used to hold the first light guides 22 on the frame 16 in the configuration illustrated in the present embodiment, the configuration is not limited to this. For example, the holding portions 170 provided integrally with the frame 16 as illustrated in FIGS. 7 and 8 may be used to hold the first light guides 22 on the frame 16. Specifically, in place of the locking concave portions 166, the holding portions 170 equivalent to the holding members 4 can be provided integrally with the frame 16 at the positions where the locking concave portions 166 of the first light guide housing chambers 161 are provided. In this case, the holding portions 170 extend upward, and projection-like locking claws protruding in the sub-scan direction are provided on upper end portions of the holding portions 170. The locking claws are equivalent to the pressing portions 41 of the holding members 4. More specifically, the holding portions 170 are formed like a vertically flipped "L" shape as viewed in the main-scan direction. The holding portions 170 can be elastically deformed to be curved in the sub-scan direction, and the locking claws provided on the upper ends of the holding portions 170 are engaged to overlap with the upper surfaces of the pressed surfaces 225 of the first light guides 22. In addition, the image sensor unit 1 may further include light guide covers that cover the first light guides 22. In this case, holding portions equivalent to the holding members 4 (holding portions that press the light guides) can be provided integrally with the light guide covers, and as in the case described above, the holding portions can include locking claws or the like equivalent to the pressing portions 41 of the holding members 4. The holding portions hold and press the first light guides 22 against the light guide covers, and the frame 16 holds the light guide covers that hold the first light guides 22. According to the configurations, the same advantageous effects can also be attained.

<Operation of Image Sensor Unit>

Next, an operation of the image sensor unit 1 will be described. In the present embodiment, one image sensor unit 1 can perform the reflection reading of the object to be read P. Furthermore, two image sensor units 1 can be arranged to face each other to perform the transmission reading of the object to be read P and the reflection reading of both surfaces. In the operation described here, two image sensor units 1 perform the reflection reading and the transmission reading.

To read the object to be read P, the two image sensor units 1 sequentially turn on the light emitting elements of each color of the light sources 21 of the reflection reading light source portions 2 and the light sources 21 and 31 of the transmission reading light source portions 3. The light emitted by the light sources 21 of the reflection reading light source portions 2 enters inside from the light incident surfaces 221 of the first light guides 22, and the light propagates inside while being diffused by the light diffusing surfaces 222. The light is then emitted from the light emission surfaces 223 toward the reading line O of the object to be read P. The light emission surfaces 223 have a shape long and thin in the main-scan direction, and the first light guides 22 shape the light emitted by the light sources 21 into a line light source (shape the light into a line). The light condensers 13 focus the reflected light from the reading line O of the object to be read P on the surfaces of the image sensors 141. The image sensors 141 convert the optical images formed by the light condensers 13 into electric signals and output the electric signals.

The light emitted by the light sources 31 of the transmission reading light source portions 3 of the opposing image sensor unit 1 enters inside from the light incident surfaces 321 of the second light guide 32 of the opposing image sensor unit 1. The light propagates inside while being diffused by the light diffusing surface 322, and the light is emitted from the light emission surface 323 toward the reading line O of the object to be read P. The light transmitted through the object to be read P enters the light condenser 13 of the image sensor unit 1, and the light condenser 13 focuses the light on the surface of the image sensor 141. The image sensor 141 converts the optical image formed by the light condenser 13 into an electric signal and outputs the electric signal.

In this way, the two image sensor units 1 read all of the reflected light of each color emitted by the reflection reading light source portions 2 and the transmitted light of each color emitted by the transmission reading light source portions 3 of the opposing image sensor unit 1 to complete the reading operation of one scan line. The two image sensor units 1 then repeat the reading operation of one scan line in the object to be read P that moves relative to the image sensor units 1 in the sub-scan direction. In this way, the reflection reading and the transmission reading are performed throughout the entire surface of the object to be read P. However, one of the two image sensors 141 may execute the transmission reading.

<Paper Sheet Distinguishing Apparatus>

Figure 10:
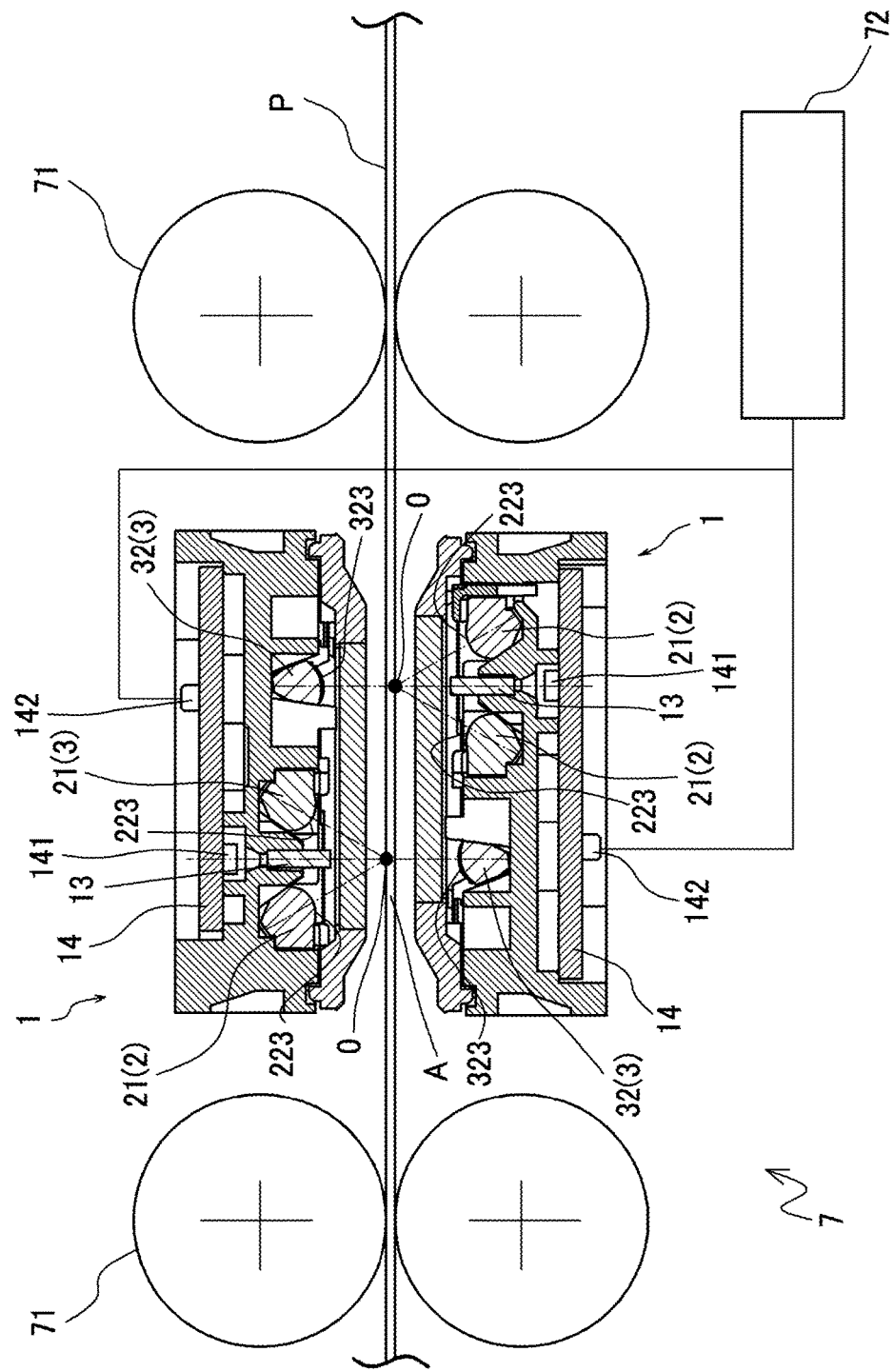
FIG. 10 is a cross-sectional view schematically illustrating a configuration example of main parts of a paper sheet distinguishing apparatus.

Next, the paper sheet distinguishing apparatus 7 in which the image sensor units 1 are applied will be described with reference to FIG. 10. FIG. 10 is a cross-sectional view schematically illustrating a configuration example of main parts of the paper sheet distinguishing apparatus 7 and is a diagram illustrating a cross section of a plane perpendicular to the main-scan direction. The paper sheet distinguishing apparatus 7 emits light to a paper sheet (a bill in the example illustrated here) that is the object to be read P and reads the light from the bill. The paper sheet distinguishing apparatus 7 uses the read light to distinguish the type and the authenticity of the bill. Note that the light sources 21 and 31 of the reflection reading light source portions 2 and the transmission reading light source portions 3 of the image sensor units 1 applied in the paper sheet distinguishing apparatus 7 include light emitting elements that emit visible light and light emitting elements that emit infrared light.

As illustrated in FIG. 10, the paper sheet distinguishing apparatus 7 includes: two image sensor units 1; conveyor rollers 71 that convey the bill as an example of the paper sheet of the object to be read P; and an image distinguishing portion 72 as distinguishing means wired to the connector 142. The two image sensor units 1 are arranged to face each other such that the optical axes of the light condensers 13 and the optical axes of the transmission reading light source portions 3 coincide with each other as viewed in the main-scan direction. A gap is provided between the two image sensor units 1, and a conveyance path A for conveying the bill is set in the gap. In other words, the two image sensor units 1 are arranged to face each other across the conveyance path A of the bill. Note that the focus of the upper side (closer to the conveyance path A) of the light condenser 13 of each of the image sensor units 1 is set at the center of the conveyance path A (that is, the gap between the two image sensor units 1) in the vertical direction.

According to the configuration, the light emitted by the transmission reading light source portion 3 of each of the image sensor units 1 transmits through the bill conveyed in the conveyance path A in the sub-scan direction and enters the light condenser 13 of the opposing image sensor unit 1. The light emitted by the reflection reading light source portion 2 of each of the image sensor units 1 is reflected by the paper sheet and enters the light condenser 13. Therefore, the two image sensor units 1 can perform the transmission reading of the bill and the reflection reading of both surfaces.

The operation of the paper sheet distinguishing apparatus 7 configured in this way is as follows. The paper sheet distinguishing apparatus 7 uses the conveyor rollers 71 to convey the bill in the sub-scan direction. More specifically, the bill is conveyed in the sub-scan direction to move the bill and the two image sensor units 1 relative to each other in the sub-scan direction in the present embodiment. While the bill is conveyed (relatively moved) in the sub-scan direction, the two image sensor units 1 execute the reflection reading and the transmission reading through the operation described above. Here, a predetermined pattern provided on the bill is read as a visible light image, and the bill is read as an infrared image. The image distinguishing portion 72 then authenticates the bill. The bill is authenticated by comparing a genuine bill image, which is obtained by emitting visible light and infrared light to a bill that is a genuine bill prepared in advance, with the visible light image and the infrared image of the bill to be determined in the authentication. This is because the bill that is a genuine bill is provided with regions where the image obtained under visible light and the image obtained under infrared light are different.

Note that the same configurations as in a conventional paper sheet distinguishing apparatus can be applied to the parts not described or not illustrated. Furthermore, the image distinguishing portion 72 may be provided on the circuit board 14. In addition, although the visible light and the infrared light are emitted to read the bill as a visible light image and an infrared image in the present embodiment, the configuration is not limited to this. For example, ultraviolet light may be emitted. Although the bill is illustrated as an example of the paper sheet that is the object to be read P, the type of the paper sheet is not limited. For example, the paper sheet of the object to be read P can be various securities or ID cards.

<Image Reading Apparatus>

Figure 11:
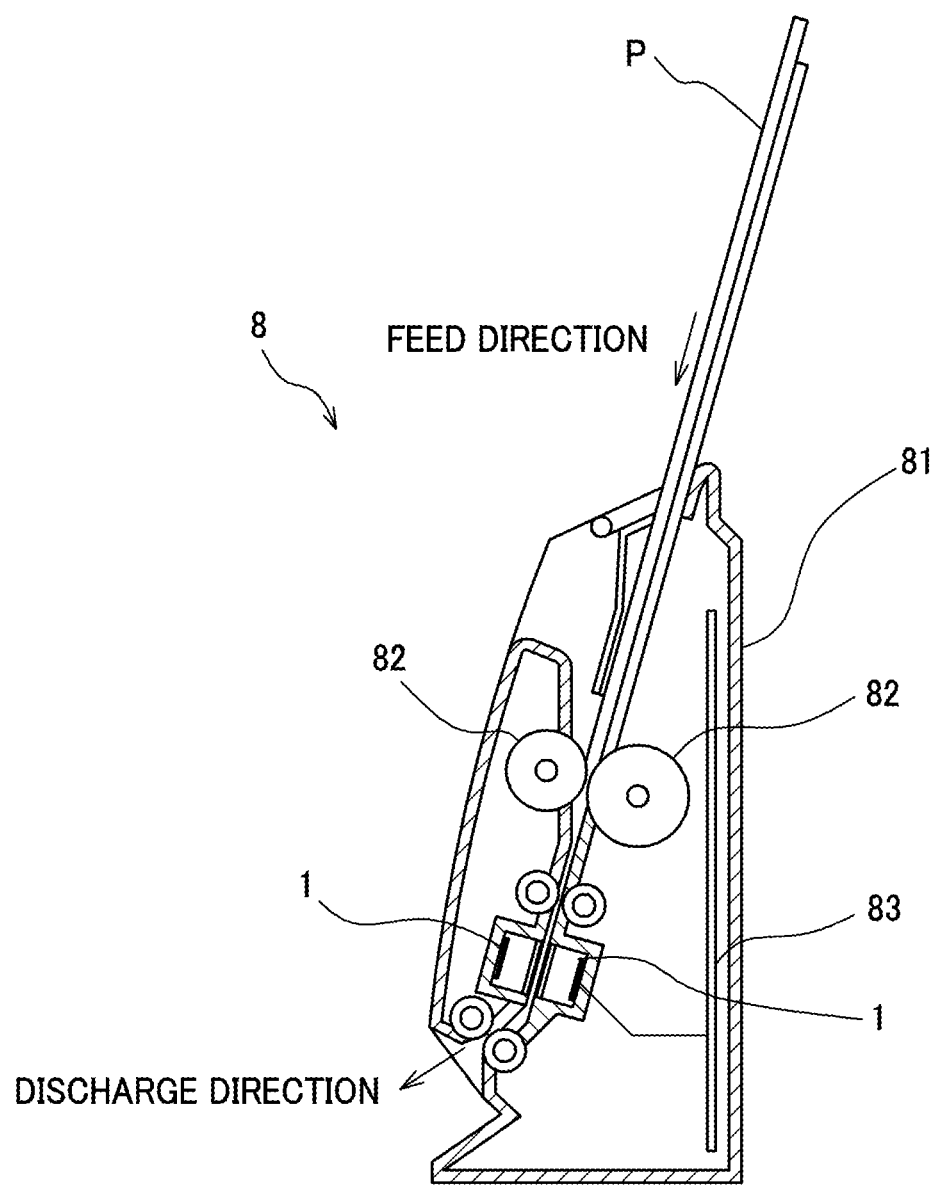
FIG. 11 is a cross-sectional view schematically illustrating a configuration example of an image reading apparatus.

Next, the image reading apparatus 8 in which the image sensor units 1 are applied will be described with reference to FIG. 11. Here, a sheet-feed type scanner will be illustrated as an example of the image reading apparatus 8. FIG. 11 is a schematic cross-sectional view illustrating a configuration of a sheet-feed type scanner that is the image reading apparatus 8. As illustrated in FIG. 11, the image reading apparatus 8 includes a housing 81, two image sensor units 1 provided to face each other, conveyor rollers 82, and a circuit board 83. The conveyor rollers 82 are rotated by a drive mechanism not illustrated, and the conveyor rollers 82 sandwich and convey the object to be read P. A control circuit that controls each portion of the image reading apparatus 8 including the image sensor units 1, a power circuit that supplies power to each portion of the image reading apparatus 8, and the like are constructed on the circuit board 83.

In the image reading apparatus 8, while the conveyor rollers 82 convey the object to be read P in the sub-scan direction, the two image sensor units 1 provided to face each other read the object to be read P. Therefore, the reflection reading and the transmission reading of the object to be read P are executed while the two image sensor units 1 and the object to be read P are moved relative to each other in the sub-scan direction.

EXAMPLE

Next, an example of the present invention will be described. FIGS. 12A to 12C are plan views schematically illustrating positions of the pressing portions 41 in the main-scan direction according to an example of the present invention and comparative examples. Note that FIG. 12A illustrates an example of the present invention, FIG. 12B illustrates a first comparative example, and FIG. 12C illustrates a second comparative example. As illustrated in FIGS. 12A to 12C, the image sensor unit of each of the example, the first comparative example, and the second comparative example includes two first light guides 22. In the example, each of the two first light guides 22 is held by three holding members 4 and 4x as illustrated in FIG. 12A. Among the holding members 4 and 4x, the holding members 4x provided on both ends in the main-scan direction are positioned outside of the range (outside in the main-scan direction) of the range (effective reading range E) in which the image sensor unit 1 reads the object to be read P. Therefore, the holding members 4x may not fulfill the positional relationship illustrated in the embodiment. Among the three holding members 4 and 4x that hold each of the first light guides 22, the position of one holding member 4 (holding member 4 at the center in the main-scan direction) provided in the range of the effective reading range E is shifted in the main-scan direction. In the first comparative example, each of the two first light guides 22 is held by four holding members 4 and 4x as illustrated in FIG. 12B. The pressing portions 41 of the four holding members 4 and 4x that hold one of the first light guides 22 and the four holding members 4 and 4x that hold the other first light guide 22 are at the same positions in the main-scan direction. The second comparative example is a reference example, and as illustrated in FIG. 12C, each of the two first light guides 22 is held by the holding members 4x at two locations on both ends in the main-scan direction outside of the range of the effective reading range E and is not held in the range of the effective reading range E.

First, the position of the center in the height direction of the conveyance path A of the two image sensor units 1 provided to face each other is handled as 0 mm, and the object to be read P is arranged at positions of distances ±0.5 mm and ±1.0 mm from the position 0 mm in the height direction. Note that the direction toward the image sensor unit 1 that acquires the output is handled as a negative side in the vertical direction, and the direction away from the image sensor unit 1 is handled as a positive side. Then, the output of the image sensor 141 is acquired, and the output at each position is divided by the output at the position of 0 mm to calculate an output ratio. FIG. 13A is a graph illustrating output ratios of the image sensor 141 of the image sensor unit 1 according to the example of the present invention. FIG. 13B is a graph illustrating an example of measurement results of the output of the image sensor 141 of the image sensor unit 1 according to the first comparative example. Note that in the graphs of FIGS. 13A and 13B, the horizontal axis indicates the position in the main-scan direction, and the vertical axis indicates the output ratio of the image sensor unit 1.

In the result obtained in the first comparative example, the output ratios of the sections corresponding to the pressing portions 41 are locally high when the object to be read P is arranged at the position of −1.0 mm as illustrated in FIG. 13B. In the obtained result, the tendency of the output ratio when the object to be read P is at the position of −1.0 mm and the tendency of the output ratio when the object to be read P is at the other positions are different, and the similarity is broken. On the other hand, in the example, the output ratios of the sections corresponding to the pressing portions 41 are not high even when the object to be read P is arranged at the position of −1.0 mm as illustrated in FIG. 13A, and uniform output ratios are obtained throughout the entire main-scan direction. Furthermore, the output ratios indicate the same tendency when the object to be read P is at the positions of 0 mm, ±0.5 mm, and ±1.0 mm, and it is confirmed that the similarity is not broken.

Figure 14B:
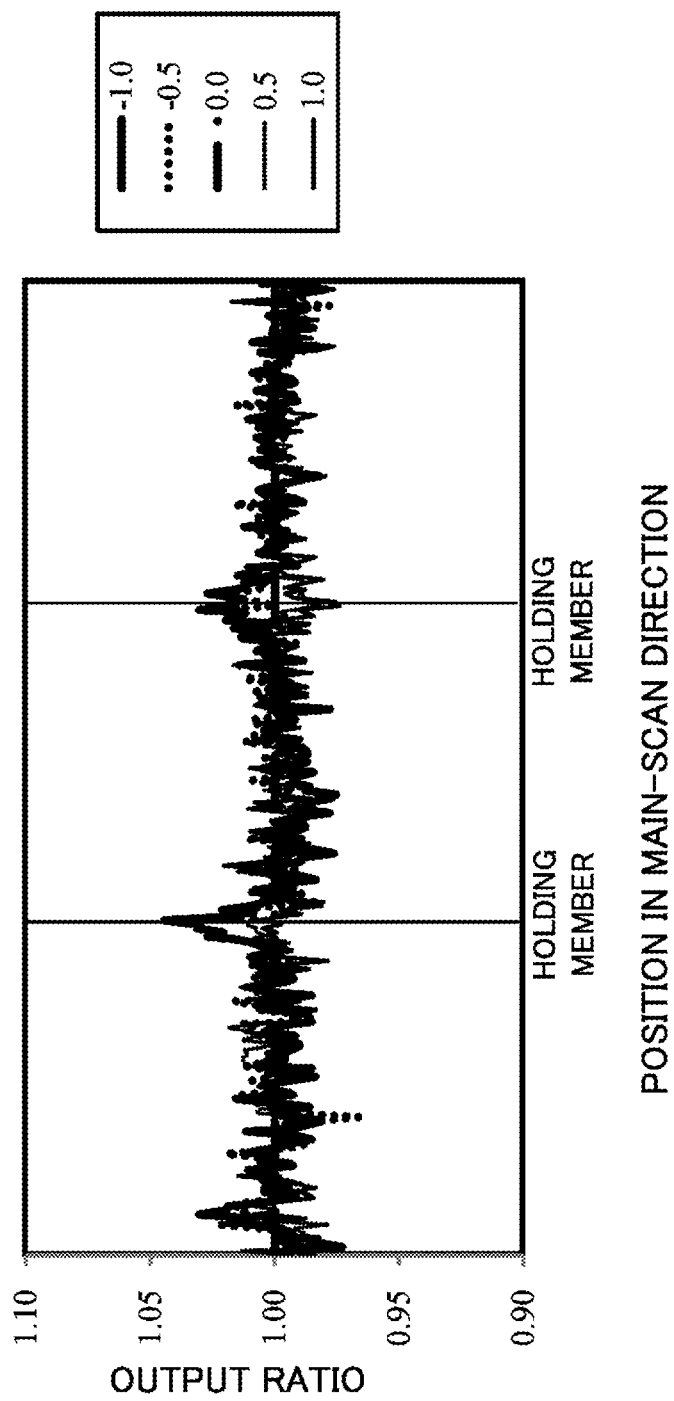
FIG. 14B is a graph illustrating output ratios of the comparative example.

FIG. 14A is a graph illustrating a result of dividing the output of the image sensor unit 1 according to the example of the present invention by the output of the image sensor unit 1 according to the second comparative example. FIG. 14B is a graph illustrating a result of dividing the output of the image sensor unit 1 according to the first comparative example by the output of the image sensor unit 1 according to the second comparative example. In the first comparative example, the output of the image sensor 141 is greater than the output in the second comparative example at the positions corresponding to the pressing portions 41 when the object to be read P is arranged at the position of −1.0 mm as illustrated in FIG. 14B. On the other hand, the output of the image sensor 141 in the example is not greater than the output in the second comparative example at the positions corresponding to the pressing portions 41 even when the object to be read P is arranged at the position of −1.0 mm as illustrated in FIG. 14A. As a result, it is confirmed that the change in the local output caused by the pressing portions 41 can be reduced according to the embodiment of the present invention.

In this way, according to the example of the present invention, it is confirmed that the change in the intensity of light (amount of light) caused by the pressing portions 41 can be reduced to make the output of the image sensor 141 uniform. It is also confirmed that the tendency of the output ratio is the same (similarity is not broken) even when the object to be read P moves in the vertical direction.

Although the embodiment and the example of the present invention have been described in detail, the embodiment and the example just illustrate specific examples in implementing the present invention. The technical scope of the present invention is not limited to the embodiment and the example. The present invention can be changed in various ways without departing from the scope of the present invention.

For example, although the holding members including the pressing portions are members separate from the frame in the configuration illustrated in the embodiment, the configuration is not limited to this. The pressing portions may be formed integrally with the frame. More specifically, as long as the pressing portions overlap with the pressed surfaces (surfaces closer to the object to be read) of the light guides, the pressing portions may be provided on the holding members that are members separate from the frame, or the pressing portions may be provided integrally with the frame. In addition, the image sensor unit may further include light guide covers that cover the first light guides, and holding portions equivalent to the pressing portions of the holding members may be provided on the light guide covers. The same advantageous effects can be attained by any of the configurations.

Although the image sensor unit includes the transmission reading light source portions in the configuration illustrated in the embodiment, the image sensor unit may not include the transmission reading light source portions. Although the image sensor unit includes two first light guides in the configuration illustrated in the embodiment, the number of first light guides is not limited to two. For example, the image sensor unit may include three or more first light guides.

Furthermore, the image reading apparatus according to the present invention is not limited to the image scanner with the configuration described in the embodiment. Apparatuses with image reading functions, such as a copying machine and a facsimile, in which the image sensor unit according to the present invention is applied are also included in the image reading apparatus of the present invention.

INDUSTRIAL APPLICABILITY

The present invention can also be effectively used in an image sensor unit including a plurality of light guides and in a paper sheet distinguish apparatus or an image reading apparatus (for example, an image scanner, a facsimile, a copying machine, and a compound machine) in which the image sensor unit is applied. According to the present invention, the output can be made uniform, and the breaking of the similarity of the output can be reduced.

The invention claimed is:

1. An image sensor unit elongated in an X direction, comprising:
   two rod-like light guides elongated in the X direction, the two light guides being arranged such that surfaces on sides of the two light guides that are elongated in the X direction face each other, the two light guides being configured to emit light from light emission surfaces elongated in the X direction;
   two light sources configured to provide incident light to the respective light guides;
   an image sensor elongated in the X direction and configured to receive light from an object to be read; and
   a frame housing the two light guides,
   wherein:
   the two light sources are arranged such that the light incident on the respective light guides is incident on the respective light guides from surfaces of ends of the respective light guides facing the X direction,
   the two light guides are pressed to the frame by a plurality of holding members provided at intervals in the X direction, and
   a first holding member of the plurality of holding members pressing the light guides and a second holding member of the plurality of holding members pressing the light guides, which is a holding member of the plurality of holding members that is closest to the first holding member in the X direction, are arranged at locations deviated from each other in the X direction.

2. The image sensor unit according to claim 1, wherein the deviated locations of the first holding member and the second holding member are arranged in a range in which the image sensor is configured to receive the light from the object to be read.

3. An image reading apparatus, comprising:
   the image sensor unit according to claim 1; and
   a conveyor that relatively changes positions of the image sensor unit and the object to be read.

4. The image reading apparatus according to claim 3, wherein the conveyor includes a conveyor roller configured to convey the object to be read.

5. An image reading apparatus comprising:
   two image sensor units according to claim 1; and
   a conveyor that relatively changes positions of the two image sensor units and the object to be read,
   wherein the two image sensor units are configured to read the object while the object is arranged between the two image sensor units.

6. The image reading apparatus according to claim 5, wherein the conveyor includes a conveyor roller to convey the object to be read.

7. A distinguishing apparatus comprising:
   the image sensor unit according to claim 1;
   a conveyor that relatively changes positions of the image sensor unit and the object to be read; and
   an image distinguisher configured to determine an authenticity of the object to be read.

8. The distinguishing apparatus according to claim 7, wherein the conveyor includes a conveyor roller to convey the object to be read.

* * * * *